US011514515B2

(12) United States Patent
Xu et al.

(10) Patent No.: US 11,514,515 B2
(45) Date of Patent: Nov. 29, 2022

(54) GENERATING SYNTHETIC DATA USING REJECT INFERENCE PROCESSES FOR MODIFYING LEAD SCORING MODELS

(71) Applicant: Adobe Inc., San Jose, CA (US)

(72) Inventors: Maoqi Xu, San Jose, CA (US); Zhenyu Yan, Cupertino, CA (US); Jin Xu, San Jose, CA (US); Abhishek Pani, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 798 days.

(21) Appl. No.: 16/037,700

(22) Filed: Jul. 17, 2018

(65) Prior Publication Data

US 2020/0027157 A1  Jan. 23, 2020

(51) Int. Cl.
*G06Q 30/00* (2012.01)
*G06Q 40/02* (2012.01)
*G06Q 30/02* (2012.01)
*G06N 20/00* (2019.01)
*G05B 19/418* (2006.01)
*G06N 5/04* (2006.01)

(52) U.S. Cl.
CPC .......... *G06Q 40/025* (2013.01); *G06N 20/00* (2019.01); *G06Q 30/0201* (2013.01); *G06N 5/048* (2013.01)

(58) Field of Classification Search
CPC .. G06Q 40/025; G06Q 30/0201; G06N 20/00; G06N 5/048; G06N 20/20; G06N 5/003; G06N 7/005
See application file for complete search history.

(56) References Cited

U.S. PATENT DOCUMENTS 10,423,890 B1 * 9/2019 Fogarty ............... G06N 20/00
2005/0234763 A1 * 10/2005 Pinto ................ G06Q 30/0201
706/21

OTHER PUBLICATIONS

"Reject inference, augmentation, and sample selection". Banasik, 2006. (Year: 2006).*
"Plausible Deniability for Privacy-Preserving Data Synthesis".2017 (Year: 2017).*
Reinforcement and Systemic Machine Learning for Decision Making—Systemic Machine Learning and Model Chapter 4. Parag. 2012. (Year: 2012).*
"On support vector decision trees for database marketing",IEEE. Jan. 1, 1999. (Year: 1999).*

* cited by examiner

Primary Examiner — Maria V Vanderhorst
(74) Attorney, Agent, or Firm — Keller Preece PLLC

(57) ABSTRACT

Methods, systems, and non-transitory computer readable storage media are disclosed for using reject inference to generate synthetic data for modifying lead scoring models. For example, the disclosed system identifies an original dataset corresponding to an output of a lead scoring model that generates scores for a plurality of prospects to indicate a likelihood of success of prospects of the plurality of prospects. In one or more embodiments, the disclosed system selects a reject inference model by performing simulations on historical prospect data associated with the original dataset. Additionally, the disclosed system uses the selected reject inference model to generate an imputed dataset by generating synthetic outcome data representing simulated outcomes of rejected prospects in the original dataset. The disclosed system then uses the imputed dataset to modify the lead scoring model by modifying at least one parameter of the lead scoring model using the synthetic outcome data.

20 Claims, 10 Drawing Sheets

GENERATING SYNTHETIC DATA USING REJECT INFERENCE PROCESSES FOR MODIFYING LEAD SCORING MODELS

BACKGROUND

Determining which potential customers to engage is an important part of entity resource allocation. Specifically, engaging potential customers can require a significant amount of time, in addition to human and computing/hardware resources. Because of the importance of determining which potential customers to engage, entities often use various metrics to determine which leads to follow (i.e., which prospects to engage). Due to the number and variability of metrics associated with individual customers and potential customers, determining which leads to follow is often a difficult aspect of entity resource allocation.

To address these difficulties, some conventional methods rank potential prospects based on the identified metrics and then use the rankings to determine which potential prospects to engage. For instance, some conventional methods use credit scoring models that determine a set of prospects that are likely not to default (e.g., based on the level of risk) when determining whether to provide loans to potential borrowers. While these, and similar, conventional ranking methods can be helpful in identifying at least some leads that are most likely to result in successful engagement, conventional lead scoring models suffer from several drawbacks.

For example, many conventional methods lack accuracy because the conventional methods often incorporate bias into the scoring models based on the training data used. In particular, some conventional methods fail to utilize data corresponding to rejected prospects (i.e., prospects that are not engaged due to the corresponding scores/rankings, and for which no engagement data exists) when training/updating the scoring models. As a result, such conventional methods typically use only data from accepted prospects (i.e., prospects that are engaged), limiting the training of the scoring models only to a subset of all available data and implementing a bias into the models.

Furthermore, utilizing only data for accepted prospects results in a lack of efficiency and flexibility of the conventional systems. In particular, by utilizing data for only a portion of leads, the conventional systems must rely on data from a larger group of leads than if the conventional systems were to incorporate data from rejected prospects in training and updating the scoring models. Accordingly, the conventional systems inefficiently use computing resources for processing data to generate scores for prospects.

SUMMARY

One or more embodiments provide benefits and/or solve one or more of the foregoing or other problems in the art with systems, methods, and non-transitory computer readable storage media for utilizing reject inference models for generating synthetic data in connection with lead scoring models. For example, the disclosed systems first identify an output of a scoring model that generates scores indicating the likelihood of success of candidate prospects. The disclosed systems then generate an imputed dataset by utilizing a reject inference model on rejected prospects of the candidate prospects to generate synthetic outcome data for at least some of the rejected prospects. The disclosed systems then use the imputed dataset with the synthetic outcome data to update the scoring model by modifying one or more parameters of the scoring model based on the synthetic outcome data. The disclosed systems can thus efficiently and accurately train and update scoring models by taking into consideration missing data from an original dataset to product improved scoring of candidate prospects.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which.

DETAILED DESCRIPTION

Figure 1:
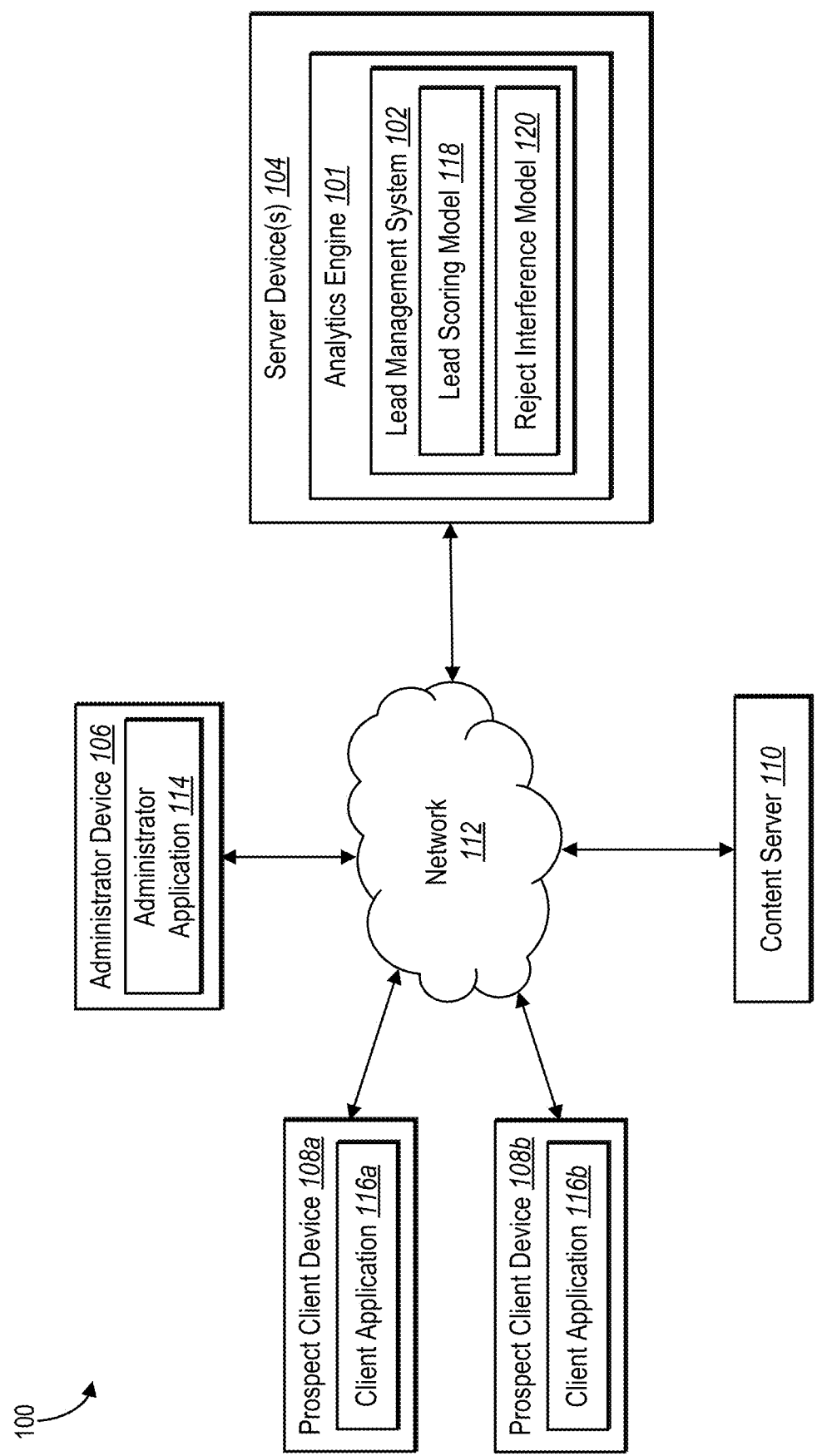
FIG. 1 illustrates an environment in which a lead management system can operate in accordance with one or more implementations.

One or more embodiments of the present disclosure include a lead management system that generates an imputed dataset using a reject inference model for modifying a lead scoring model. For example, the lead management system uses characteristics of an original dataset based on an output of the lead scoring model to determine whether to use an imputed dataset with synthetic data for reject data from the original dataset. The lead management system selects a reject inference model for generating the imputed dataset based on a plurality of simulations on historical prospect data. The lead management system then uses the selected reject inference model to generate an imputed dataset including synthetic outcome data representing simulated outcomes for the reject data. Using the imputed dataset, the lead management system then modifies the lead scoring model by changing one or more parameters of the lead scoring model based, at least in part, on the synthetic outcomes. The lead management system can thus expand the available dataset for improving the lead scoring model to more accurately and efficiently identify prospects that are likely to lead to good outcomes.

As described above, the lead management system can select a reject inference model to use when generating an imputed dataset from an original dataset. Specifically, the lead management system uses simulation data for a plurality of simulations on historical data corresponding to the original dataset (e.g., historical data for prospects previously scored by the lead scoring model) to determine which reject inference model to use. Because each dataset may differ in characteristics and type of data, the lead management system can select from a plurality of different reject inference models to determine which model works best for a given dataset by running a number of simulations on related historical data.

Furthermore, the lead management system uses a selected reject inference model to generate an imputed dataset from an original dataset. Because reject data corresponds to leads for which there is no engagement data (e.g., data resulting from a member of an entity following up on the lead by contacting the prospect) or outcome data (e.g., data representing a success or failure of an engagement), the lead management system uses the reject inference model to generate the imputed dataset. In particular, the reject inference model outputs synthetic outcome data for the reject data of the original dataset to create a dataset with real and synthetic data based on the real data of the original dataset. The synthetic outcome data can include a label indicating the outcome of a given rejected prospect, and in some cases a weighting/score, depending on the reject inference model that the lead management system uses.

After generating an imputed dataset, the lead management system then uses the imputed dataset to update the lead scoring model. Specifically, the lead management system modifies one or more parameters of the lead scoring model using the imputed dataset, which includes real data from the original dataset and synthetic data from the reject inference model. Thus, the lead management system uses at least some synthetic data to modify the lead scoring model and improve the performance of the lead scoring model for future datasets. In at least some implementations, the lead management system also uses the updated lead scoring model to re-score the original dataset to identify additional leads to follow.

In addition to selecting a reject inference model to use from a plurality of reject inference models, the lead management system can also determine whether to generate an imputed dataset from an original dataset based on characteristics of the original dataset. For instance, specific characteristics corresponding to a dataset (e.g., effectiveness of lead scoring split of accepted/rejected, success rate of the original dataset, accepted-to-known ratio size) can affect whether a reject inference model provides accurate generation of synthetic data for updating a lead scoring model. Accordingly, the lead management system can identify the characteristics of the original dataset and then determine whether to generate an imputed dataset for updating the lead scoring model. If the characteristics do not meet predetermined thresholds, the lead management system may instead use the original dataset to adjust the model.

As mentioned, the lead management system provides a number of advantages over conventional systems. For example, the lead management system improves the accuracy of computing systems lead scoring models. In particular, the lead management system improves accuracy by utilizing reject data that conventional systems ignore. For instance, by generating synthetic outcome data for reject data in an original dataset, the lead management system can increase a size of the original dataset for updating the lead scoring model. The increased size of the original dataset allows the lead management system to train/modify the lead scoring model with greater accuracy by increasing the size of the training dataset in addition to limiting bias. In contrast, conventional lead scoring systems introduce bias by training credit score models only on accepted/known data.

Moreover, the lead management system improves the flexibility of computing systems implementing lead scoring models. Specifically, the lead management system improves flexibility by utilizing reject data in addition to accept data for informing the improvement of lead scoring models. By utilizing a larger dataset by incorporating the reject data (including synthetic data from a reject inference model) with the accept data from a dataset, the lead management system can apply the lead scoring model to different datasets. Accordingly, while conventional systems are typically limited to applying a credit score model to a specific dataset to obtain a minimum accuracy (and thus use different models for different datasets), the lead management system can train and apply a lead scoring model to more than one dataset while retaining high accuracy by using the reject inference process.

As illustrated by the foregoing discussion, the present disclosure utilizes a variety of terms to describe features and advantages of the lead management system. Additional detail is now provided regarding the meaning of the terms. For example, as used herein, the term "lead" refers to an indication of potential interest by a prospect in a product or service. A lead can include an expression of interest by a prospect. For instance, a lead can include, but is not limited to, a prospect requesting information associated with a product or service provided by an entity, such as by visiting a website of the product/service or requesting email or other communications from the entity in connection with the product or service. Additionally, as used herein, the term "prospect" refers to a potential customer of a product or service or potential repeat customer. For example, a prospect can include an entity such as an individual or a business.

As used herein, the terms "lead scoring model" and "scoring model" refer to a computerized model that generates scores indicating a likelihood of success of a plurality of leads. For instance, a lead scoring model can be a machine-learning model including, but not limited to, a case-weighted random forest model or other regression model that indicates a likelihood that a lead results in a conversion of a prospect to a customer. A machine-learning model can include a model that utilizes algorithms to learn from, and make predictions on, known data by analyzing the known data to learn to generate outputs that reflect patterns and attributes of the known data. For instance, a machine-learning model can include but is not limited to, decision trees, support vector machines, linear regression, logistic regression, Bayesian networks, random forest learning, dimensionality reduction algorithms, boosting algorithms, artificial neural networks, deep learning, etc. Thus, a machine-learning model makes high-level abstractions in data by generating data-driven predictions or decisions from the known input data.

As used herein, the term "engagement" refers to an entity initiating contact with a prospect corresponding to a lead. For example, in a marketing context, engagement with a prospect can include an agent (e.g., a sales representative) of an entity contacting the prospect by email, phone, or other communication medium to follow-up on the prospect's previously expressed interest in a product.

As used herein, the terms "synthetic data" and "synthetic outcome data" refer to synthetically generated data that is output by a reject inference model. Specifically, synthetic outcome data can include one or more data points indicating an outcome of a rejected lead based on an output of a lead scoring model. For instance, an outcome of a lead can include a value of "0" indicating that an outcome of a particular lead corresponds to a failed outcome, while a value of "1" indicates that an outcome of a lead corresponds to a successful outcome. Alternatively, outcome data can include a score (e.g., a value between zero and one) that indicates a likelihood of a lead corresponds to a successful outcome with a weighting applied to the score. Thus, synthetic outcome data includes synthetically generated outcomes (e.g., according to the corresponding classifiers/scoring output of the lead scoring model) for rejected leads that otherwise lack outcome data (e.g., due to lack of engagement).

As used herein, the term "reject inference model" refers to a model that analyzes a dataset to generate synthetic outcomes for reject data in the dataset. For example, a reject inference model can include, but is not limited to, a simple augmentation model or a fuzzy augmentation model. A reject inference model can thus create synthetic outcomes for reject data, and in some cases weightings, which the lead management system can use to train and/or modify a lead scoring model to more accurately and efficiently score leads for identifying good leads that are more likely to lead to successful outcomes.

As used herein, the term "characteristic" with respect to a dataset refers to an attribute describing an aspect of a dataset. A dataset characteristic includes a size of an accepted-to-known ratio of leads in the dataset, an effectiveness of a scoring split of a dataset, and/or a success rate of the dataset (i.e., number of positive elements in the dataset divided by the number of total elements in the dataset).

Session features include, but are not limited to, attributes of a computing device associated with the session (including a client device or a server), attributes of a software application associated with the session, attributes of interactions of the session, or attributes describing how the session is conducted. For example, attributes can include IP addresses, computing devices (e.g., desktop computer, laptop computer, smartphone), browser information, user authentication information (e.g., login information, one-time authorization codes), session length/duration, locations accessed within a domain, type of interaction (e.g., product purchase), software application requesting the session, communication protocol, geographical information, or other possible attributes of a session.

As used herein, the term "simulation" refers to a computer-simulated study of data with a specified set of parameters to determine a simulated outcome. In particular, a simulation for a lead scoring model can include performing simulations on historical data to select a reject inference model from a plurality of reject inference models that provides a most accurate output for the historical data. For instance, a simulation can perform a plurality of simulations on a training dataset including historical data associated with an original dataset corresponding to leads and then use an output of the simulations to select a reject inference model for generating synthetic outcome data for reject data in the original dataset.

Additional detail will now be provided regarding the lead management system in relation to illustrative figures portraying exemplary implementations. For example, FIG. 1 illustrates an embodiment of an environment 100 in which a lead management system 102 can operate. In particular, the environment includes server device(s) 104, an administrator device 106, prospect client devices 108a, 108b, and a content server 110. One or more of the components may be in connection via a network 112. The server device(s) 104 include an analytics engine 101 and the lead management system 102. Moreover, as shown, the administrator device 106 includes an administrator application 114. In at least some implementations, the prospect client devices 108a, 108b can also include client applications 116a, 116b. Furthermore, the lead management system 102 can include a lead scoring model 118 and a reject inference model 120.

In one or more embodiments, the administrator device 106 includes a computing device capable of performing operations associated with campaign management and lead management. For example, the administrator device 106 can include a desktop computer, laptop computer, tablet, smartphone, or other device that is able to access the lead management system 102 at the server device(s) 104. As mentioned, the administrator device 106 can include the administrator application 114, which can include software for communicating with the server device(s) 104 to provide and obtain information related to campaign management and lead management operations described herein.

Furthermore, the administrator device 106 may be associated with the content server 110. The administrator application 114 may allow the administrator device 106 to communicate with the content server 110 to perform content management operations on the content server. In one or more embodiments, the content server 110 may include content associated with a product or service provided by an entity. For example, the content server 110 can host a web page corresponding to the product or service to allow prospects to view information about the product/service and/or to purchase the product/service. In one or more embodiment, the content server 110 and the administrator device 106 are part of the same system. Alternatively, the content server 110 and the administrator device 106 may be part of separate systems, such that the administrator device 106 can perform content management operations for a plurality of different content servers and/or entities.

In one or more embodiments, the prospect client devices 108a, 108b include computing devices capable of accessing content on the content server 110 via the network 112. For instance, one or more of the prospect client devices 108a, 108b can include mobile devices such as a mobile telephone, smartphone, PDA, tablet, or laptop computer. Alternatively, one or more of the prospect client devices 108a, 108b can include a non-mobile device such as a desktop computer. The prospect client devices 108a, 108b also include client applications 116a, 116b that include software (e.g., a web browser or other application) for sending requests to the content server 110 to access content. Additionally, while FIG. 1 illustrates two prospect client devices 108a, 108b, the content server 110 may be in communication with any number of prospect client devices.

The content server 110 and/or the administrator device 106 may be in communication with the server device(s) 104 via the network 112 to provide information to the lead management system 102. Specifically, the lead management system 102 obtains, from the administrator device 106 and/or the content server 110, information associated with a plurality of leads. For instance, the content server 110 can provide requests (e.g., lead information) by prospect client devices to access content to the lead management system 102. Alternatively, the administrator device 106 can communicate access requests to the lead management system 102. In yet another example, the lead management system 102 can manage access requests for the content server 110 (e.g., as an intermediate server between the prospect client devices 108a, 108b and the content server 110) and store access request information in a database.

In one embodiment, the analytics engine 101 can track and store various user data based on user-initiated communication between the prospect client devices 108a-108b and the content server 110. For example, the analytics engine 101 may track user data including, but not limited to, user actions (i.e., URL requests, link clicks, mouse hovers, text inputs, video views, button clicks, etc.), timestamp data (i.e., when a link was clicked, how long a user stayed on a webpage, when an application was closed, etc.), path tracking data (i.e., what web pages a user visits during a given session, etc.), demographic data (i.e., an indicated age of a user, an indicated gender of a user, an indicated socioeconomic status of a user, etc.), geographic data (i.e., where a user is located, where a web page request came from, etc.), and transaction data (i.e., the types of purchases a user makes, etc.), as well as other types of data.

To illustrate, in one embodiment, the content server 110 may be a webserver, and the prospect client device 108a may communicate with the content server 110 to request web page information so that the prospect client device 108a can display a certain web page to the user. In that case, the analytics engine 101 may track the user action (i.e., requesting the web page data), the time the action was performed, the geographic information associated with the prospect client device 108a (e.g., a geographic area associated with an IP address assigned to the prospect client device 108a), and/or any demographic data that may be associated with the user of the prospect client device 108a.

The analytics engine 101 can track and store data in various ways. For example, in some instances, the content server 110 may track data. In one embodiment, the content server 110 can track data and then provide the data to the analytics engine 101. Alternatively, or additionally, the analytics engine 101 may receive data directly from the prospect client devices 108a-108b. For example, the content server 110 may install software code on the prospect client devices 108a-108b that causes the prospect client devices 108a-108b to report data directly to the analytics engine 101.

The lead management system 102 can use the data tracked or gathered by the analytics engine 101. For example, lead management system 102 can use the lead scoring model 118 to generate scores for the leads. The scores for the leads indicate a likelihood of each score resulting in a successful outcome. In one or more embodiments, the lead management system 102 compares the scores to a threshold and then indicates to the administrator device 106 a plurality of leads that meets the threshold for an agent to follow. For instance, the lead management system 102 can use the threshold to label the leads as accepted or rejected, which the corresponding entity can then use to follow the accepted leads (e.g., by contacting the prospects associated with the accepted leads).

The administrator device 106 can provide engagement information and outcome information associated with leads to the lead management system 102 in accordance with lead scoring from the lead scoring model. In particular, the administrator device 106 can obtain engagement information that indicates whether each lead has engagement information (e.g., whether a contact with a prospect has occurred) and whether each engaged lead has outcome information (e.g., a successful engagement resulting in conversion or a failed engagement resulting in no conversion). Alternatively, another device or system may obtain and provide the engagement information and outcome information to the lead management system 102. The lead management system 102 then stores the engagement information and outcome information with the leads to the lead management system.

Once the lead management system 102 receives or otherwise identifies the leads and the engagement/outcome information (e.g., an original dataset), the lead management system 102 can then update the lead scoring model. For example, the lead management system 102 can analyze the information to determine whether to generate an imputed dataset from the original dataset or to instead use the original dataset to update the lead scoring model. The lead management system 102 generates an imputed dataset using a reject inference model (e.g., reject inference model 120) by first selecting the reject inference model based on simulations performed on historical prospect data and then generating synthetic outcome data for the reject data.

The lead management system 102 uses the imputed dataset to update/train the lead scoring model 118. In particular, the lead management system 102 uses the synthetic outcome data for the reject data to modify one or more parameters of the lead scoring model. The lead management system 102 can then use the updated lead scoring model 118 to re-score the original dataset and/or to score future leads as informed by the outcome data for the accepted leads and the synthetic outcome data for the rejected leads.

Although the environment 100 of FIG. 1 is depicted as having various components, the environment may have any number of additional or alternative components (e.g., any number of servers, server devices, administrator devices, client devices, or other components in communication with the lead management system 102). In particular, FIG. 1 illustrates a particular number and arrangement of administrator device 106, prospect client devices 108a, 108b, and content server 110, it will be understood that the environment 100 can include any number of devices, including any number of prospect client devices, administrator devices, or content servers. Accordingly, the lead management system 102 can utilize information from any number of prospect client devices and content servers to improve lead scoring for use by any number of administrator devices.

Additionally, while FIG. 1 illustrates that the lead management system 102 can manage lead scoring and data generation for leads associated with the content server 110 and administrator device 106, the lead management system 102 can manage lead scoring and data generation for leads associated with any number of content servers and administrator devices. For instance, the lead management system 102 can provide lead management services to a plurality of entities, each with their own set(s) of leads. The lead management system 102 may thus provide lead management services for a plurality of different data types across the plurality of entities. In at least some implementations, the lead management system 102 may also use the lead scoring model 118 for a plurality of different entities.

Figure 2:
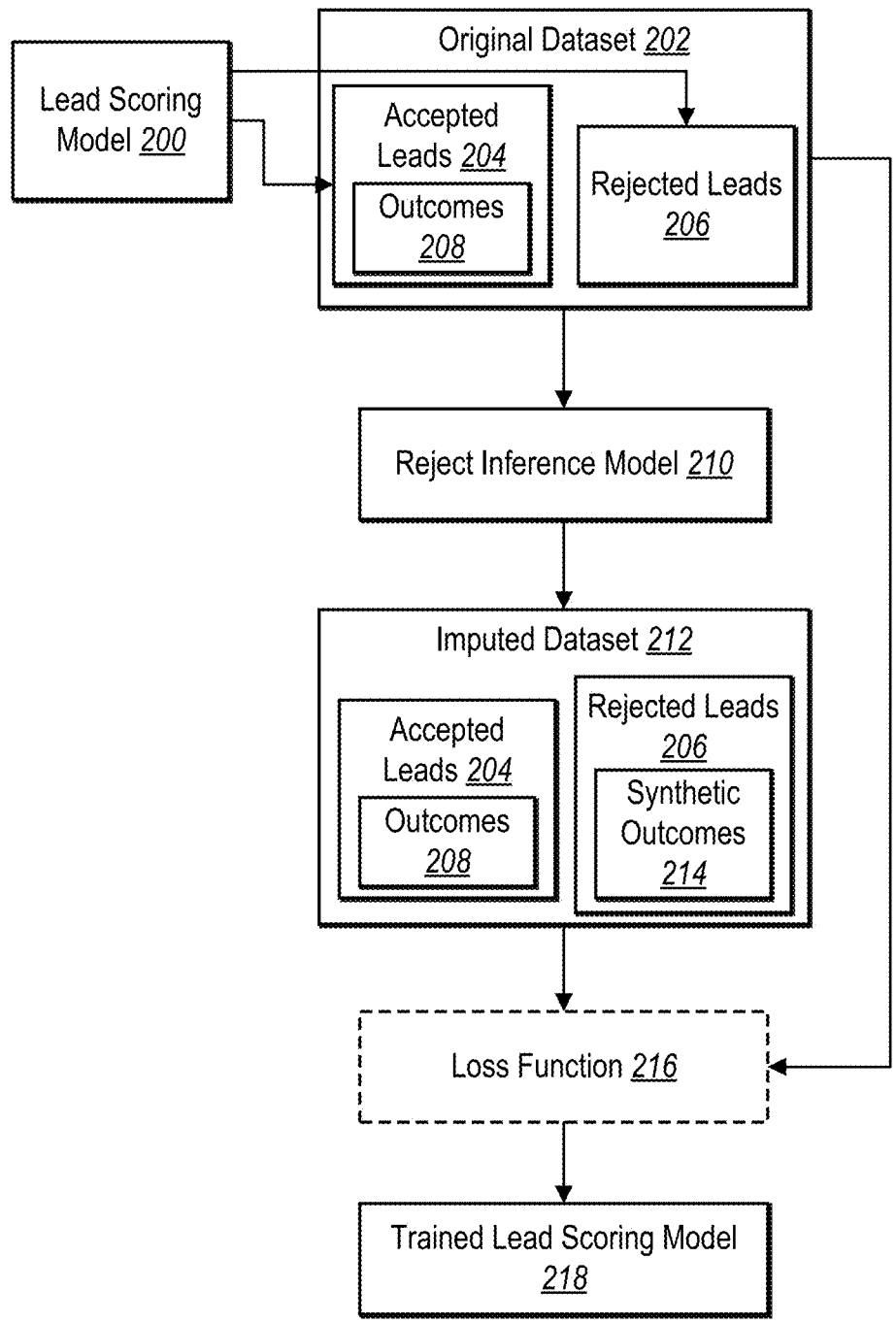
FIG. 2 illustrates a diagram of a process for generating an imputed dataset using a reject inference model in accordance with one or more implementations.
Figure 3:
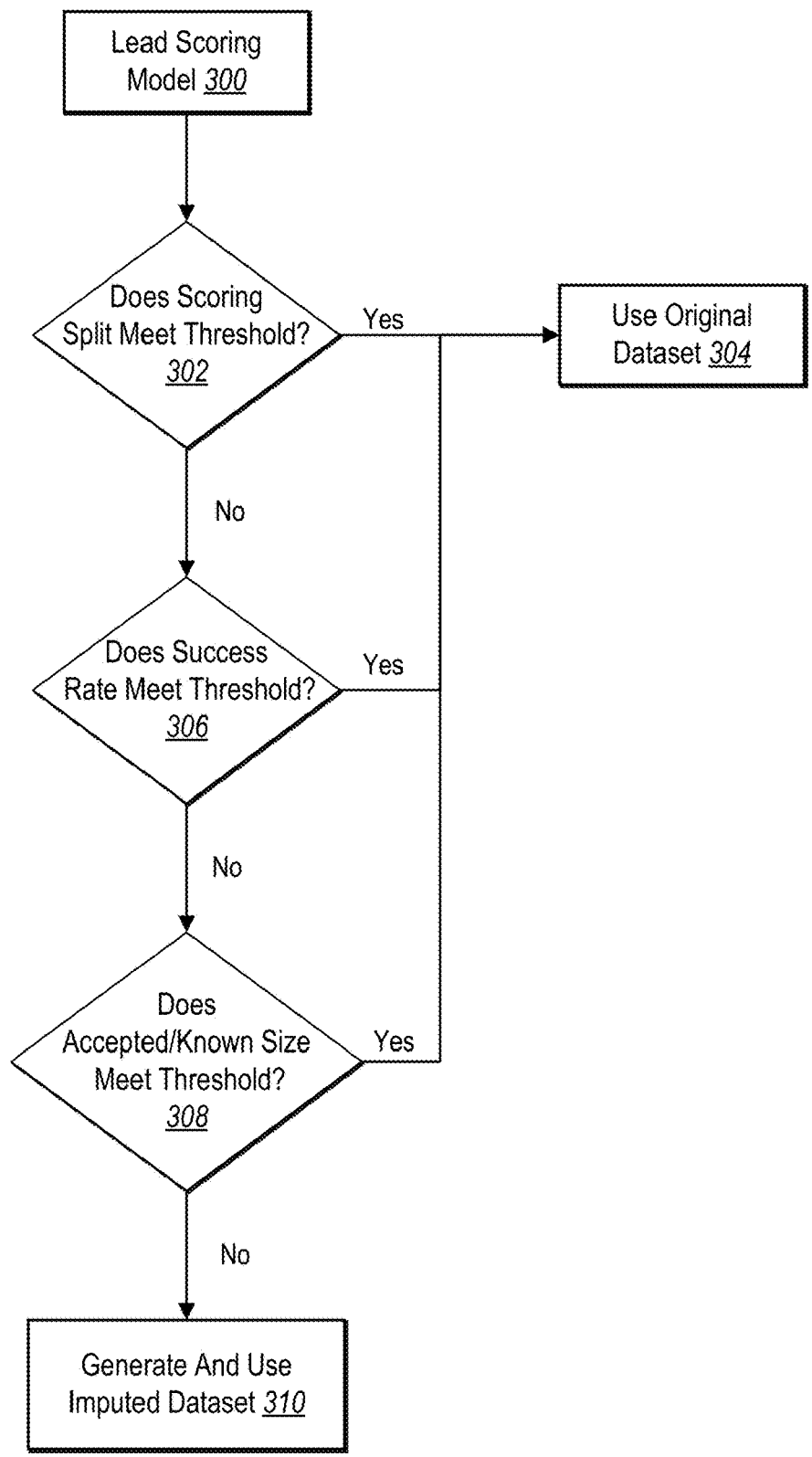
FIG. 3 illustrates a diagram of a decision process for determining whether to generate an imputed dataset in accordance with one or more implementations.

As briefly mentioned above, the lead management system 102 performs the operations described herein for providing synthetic outcome data for reject data using a reject inference model to modify a machine-learning lead scoring model. FIG. 2 illustrates a diagram of a process for generating an imputed dataset using a reject inference model. Additionally, FIG. 3 illustrates a diagram of a process for determining whether to use an imputed dataset or an original dataset for updating a lead scoring model based on characteristics of the original dataset. Thus, while FIG. 2 illustrates a process for generating an imputed dataset, the lead management system 102 may first determine whether to use an imputed dataset, as illustrated in FIG. 3. In other embodiments, the lead management system 102 generates an imputed dataset without first analyzing the characteristics of the original dataset.

As shown in FIG. 2, a process for generating an imputed dataset using a reject inference model begins with the lead management system 102 utilizing a lead scoring model 200 to generate scores for leads associated with an entity. As previously mentioned, the lead scoring model 200 can include a machine-learning model such as a case-weighted random forest. The lead management system 102 uses the lead scoring model 200 to analyze the leads to generates scores indicating a likelihood of resulting in a successful outcome. A successful result can include a conversion of a corresponding prospect to a customer (e.g., by a prospect purchasing the product or service). Alternatively, a successful result may include other actions by a prospect such as a prospect creating an account or profile.

In one or more embodiments, the lead management system 102 uses the lead scoring model 200 to analyze one or more features of a lead that are indicative of the lead resulting in a successful outcome. For instance, the features can include a type of inquiry by a prospect in a product/service, a time of inquiry, a device used to generate the inquiry (e.g., mobile, laptop, desktop), a number of inquiries, a profile associated with the lead, and/or other features of the lead. The score can be an output of a classifier that classifies the leads into an accepted group or a rejected group. Alternatively, the score can be a numeric value on a predetermined scale with higher values indicating a greater likelihood of success and a lower likelihood indicating a lower likelihood of success. Based on the output scores of the lead scoring model 200, the lead management system 102 can then obtain an original dataset 202 corresponding to the scored leads.

Furthermore, the lead management system 102 can compare the scores to a threshold that determines which leads to accept or reject. In particular, if a lead meets the threshold, the lead management system 102 can label the lead as an accepted lead. Otherwise, the lead management system 102 can label the lead as a rejected lead. Accordingly, the lead management system 102 can divide the leads into a plurality of accepted leads 204 and a plurality of rejected leads 206 based on the threshold. Changing the threshold can change the number of accepted leads 204 and rejected leads 206 (i.e., the ratio of accepted leads 204 to total leads, also known as the acceptance rate).

After separating the leads into accepted leads 204 and rejected leads 206, the lead management system 102 can also maintain outcomes 208 for the original dataset 202. As previously mentioned, an outcome can include a successful outcome (e.g., a conversion) or a failed outcome (e.g., no conversion) in response to engaging a prospect. The lead management system 102 can identify the outcomes with the corresponding accepted leads 204 based on information from an administrator device (e.g., administrator device 106). The lead management system 102 can then store the outcomes 208 with the accepted leads 204 in a database. Furthermore, while the accepted leads 204 have outcomes 208, the rejected leads 206 do not have outcome data due to the lack of engagement with the rejected leads 206.

To generate synthetic data for training the lead scoring model 200, the lead management system 102 selects a reject inference model 210 to analyze the rejected leads 206 of the original dataset 202. In particular, the lead management system 102 selects the reject inference model 210 from a plurality of available reject inference models. Each of the reject inference models utilizes different methods for producing synthetic data and may perform better than other models on different datasets with different characteristics. For instance, as will be described in further detail below with respect to FIG. 5, the characteristics of the dataset that can affect the performance of the reject inference model 210 can include, but are not limited to, acceptance rate, dataset size, predictors (e.g., features of leads), and success rate.

The lead management system 102 uses a selected reject inference model 210 to generate synthetic data based on the rejected leads 206 of the original dataset 202. As briefly mentioned previously, the reject inference model 210 can be a simple augmentation model or a fuzzy augmentation model. Each of the reject inference models generates synthetic data using different operations, and therefore result in different synthetic data. Furthermore, the reject inference models can also output different amounts and/or types of synthetic data.

In one or more embodiments, the reject inference model 210 builds upon a known good-bad ("KGB") model. In particular, a KGB models (used by some conventional models for training a scoring model, typically in credit scoring applications) uses only the known "good" labels and known "bad" labels, thereby only using known labels (while excluding unknown labels in the reject data) to train scoring models. Thus, the KGB model utilizes only leads with known outcomes, which may include only accepted leads 204 in at least some embodiments. For embodiments in which the known labels include at least some rejected leads with outcomes, the KGB model may also be trained on the reject data with outcomes (i.e., a subset of rejected leads that have engagement and outcome information).

In one or more embodiments, the reject inference model 210 is a simple augmentation model. The simple augmentation model utilizes the KGB model as a base model and then performs additional operations to expand upon the KGB model based on comparisons of rejected leads 206 to a threshold. Specifically, the simple augmentation model first utilizes the KGB model to score rejected leads 206. The simple augmentation model then labels rejected leads with scores that meet a threshold as likely to be successful while labeling rejected leads with scores that do not meet the threshold as unlikely to be successful. Accordingly, the simple augmentation model allows the lead management system 102 to augment the number of observations (e.g., outcomes 208) of the original dataset 202 by the rejected leads 206.

In one or more additional embodiments, the reject inference model 210 is a fuzzy augmentation model. The fuzzy augmentation model also utilizes the KGB model as a base model to first score the rejected leads 206 (e.g., on a scale from 0 to 1) and then expands upon the KGB model. The fuzzy augmentation model then makes a copy of each rejected lead of the rejected leads 206. For the original version of a lead, the fuzzy augmentation model assigns 1 as the label with the corresponding score as the weight. For the copy of the lead, the fuzzy augmentation model assigns 0 as the label with (1—corresponding score) as the weight. Additionally, the accepted leads have a weight of 1. Thus, the fuzzy augmentation model augments the original dataset 202 to [(accepted leads 204)+2×(rejected leads)] weighted observations.

FIG. 2 illustrates an imputed dataset 212 that the lead management system 102 generates using the rejected inference model 210. As shown, the imputed dataset includes the accepted leads 204 with the real outcomes 208 based on engagements with the corresponding prospects, and in some cases outcomes of a subset of rejected leads. Furthermore, the imputed dataset 212 includes the rejected leads 206 of the original dataset with synthetic outcomes 214 that the reject inference model 210 generated. Thus, the imputed dataset 212 is an augmented version of the original dataset 202, which increases the size of the training dataset for updating/modifying the lead scoring model 200.

While FIG. 2 illustrates that the rejected leads 206 of the original dataset 202 do not have outcomes, in one or more embodiments, at least some of the rejected leads 206 have outcomes. Specifically, an entity may engage with at least some rejected leads if the entity has sufficient resources. For example, after following up on all of (or the majority of) the accepted leads 204, the entity may engage with one or more of the rejected leads 206. Thus, at least some of the rejected leads 206 may have outcomes such that the lead management system 102 can group the engaged, rejected leads with the accepted leads in the original dataset 202. The reject inference model 210 can then generate synthetic outcomes for the rejected leads that do not have outcome data. Furthermore, the lead management system 102 may generate synthetic outcomes for a subset of the rejected leads 206, rather than generating synthetic outcomes for all of the rejected leads 206.

In one or more embodiments, the process of generating synthetic data for updating a lead scoring model includes using the imputed dataset 212 to optionally generate a loss function 216. The loss function 216 indicates a difference between the lead scoring model 200 output (e.g., the scores as predictions of successful outcomes) and the actual outcomes (e.g., outcomes 208). To generate the loss function 216, the lead management system 102 compares the resulting outcomes to the predicted outcomes based on the scores from the lead scoring model 200. The loss function 216 can include one or more functions or values representing the difference(s) between the predicted and actual values. In one or more embodiments, the lead management system 102 uses weights of a fuzzy augmentation model to update a previously generated loss function (e.g., for optimization-based algorithms like logistic regression). Alternatively, the lead management system can use the weights of a fuzzy augmentation model to adjust bootstrap probabilities of observations for bootstrap-involved methods like random forests.

The lead management system 102 can then use the loss function 216 to generate a trained lead scoring model 218. Specifically, the lead management system 102 uses the function(s) and/or value(s) of the loss function 216 to modify one or more parameters or algorithms of the lead scoring model 200. Modifying parameters or algorithms of the lead scoring model 200 results in the trained lead scoring model 218 that takes into account the synthetic outcomes 214 of the imputed dataset 212 in addition to the actual outcomes 208 of the original dataset 202.

In contrast to conventional systems that introduce bias into the loss function 216 by utilizing only the outcomes for engaged leads from an original dataset, the lead management system 102 utilizes synthetic outcomes 214 from the imputed dataset 212. By using the imputed dataset 212, however, the lead management system 102 is able to increase the size of the dataset while also utilizing reject data that minimizes or eliminates the bias of the conventional systems. The lead management system 102 can then use the trained lead scoring model 218 to score new sets of leads, which the lead management system 102 can then use to further update the trained lead scoring model 218. This can allow the lead management system 102 to continually improve to reflect new trends or information in the leads. The lead management system 102 may also use the trained lead scoring model 218 to re-score the rejected leads 206 from the original dataset 202 to identify one or more additional leads that did not have any engagement information.

As mentioned above, the lead management system 102 can determine whether to use an imputed dataset for updating a lead scoring model based on characteristics of an original dataset. In particular, certain characteristics of the original dataset can affect whether generating an imputed dataset (i.e., expanding the original dataset) will improve the results when training the lead scoring model. As shown in FIG. 3, if the lead management system 102 determines that the characteristics of the original dataset meet certain thresholds, the lead management system 102 can determine that the original dataset is sufficient for adjusting the lead scoring model. Otherwise, the lead management system 102 can determine that an imputed dataset will improve the training process and then generate the imputed dataset.

A process for determining whether to generate an imputed dataset includes comparing characteristics of a lead scoring model 300 to a plurality of thresholds. The process begins by the lead management system 102 determining whether a scoring split of the lead scoring model 300 meets a scoring split threshold 302. For instance, the lead management system 102 can analyze the original dataset to determine how accurately the lead scoring model 300 labeled the accepted leads and the rejected leads. To illustrate, the lead management system 102 can determine whether the lead scoring model 300 is accurately indicating that the leads that are most likely to result in a successful outcome are labeled as accepted leads, while those that are not likely to result in a successful outcome are labeled as rejected leads.

In one or more embodiments, the lead management system 102 determines the threshold for determining whether the split of the output of the lead scoring model 300 is effective based on historical data. Specifically, the lead management system 102 can analyze the scoring splits of historical data to determine accuracy of scoring splits for previous datasets corresponding to the original dataset (e.g., associated with an entity or specific type of data). The lead management system 102 can then determine a threshold that meets a desired accuracy with a specific confidence level and/or confidence band based on the scoring splits for the previous datasets. Analyzing the historical data can also include performing simulations on the historical data using different parameters to determine the threshold and/or desired accuracy.

If the lead management system 102 determines that the scoring split of the original dataset meets the threshold (e.g., has an effective/accurate scoring split), the lead management system 102 can use the original dataset 304 for training/updating the lead scoring model 300. Meeting the split threshold can indicate that the reject rate of the original dataset is small with a small mislabel rate. For example, a small reject rate indicates that a small number of unengaged rejected leads are incorrectly labeled. Conversely, a large reject rate indicates that a large number of unengaged leads are incorrectly labeled due to the dataset containing a greater number of rejected leads.

The lead management system 102 can also determine whether the success rate of the original dataset meets a success rate threshold 306. In particular, the lead management system 102 determines whether the number of positive instances (e.g., leads with positive outcomes) in the set of leads divided by the number of total instances in the set of leads is small. A high success rate indicates a large reject rate (i.e., ratio of rejected leads to total leads) and a larger mislabel rate of rejected leads.

As with the split threshold, the lead management system 102 can use historical data to determine an appropriate success rate threshold. Specifically, the lead management system 102 can analyze the historical data (e.g., by performing a plurality of simulations with different parameters) to determine a success rate threshold that allows the lead managements system 102 to accurately determine scenarios in which imputed datasets are effective. The lead management system 102 can determine the success rate threshold using the historical data simulations and then compare the original dataset to the selected success rate threshold. If the original dataset meets the success rate threshold, the lead management system 102 (e.g., the dataset has a small success rate), the lead management system 102 uses the original dataset 304.

The lead management system 102 can also determine whether the sample size of the set of accepted/known leads of the original dataset meets a size threshold 308. The lead management system 102 determines the size of the set of accepted/known leads by identifying the number of accepted leads and leads with known labels in the original dataset. If the size of the set of accepted/known leads meets the size threshold (e.g., the size of the set of accepted/known leads is greater than or equal to the size threshold), the lead management system 102 can use the original dataset 304.

The lead management system 102 can also determine the size threshold based on the historical data. For example, the lead management system 102 can determine that imputed datasets are more useful for smaller sets of accepted/known leads because the imputed datasets can increase the amount of data available for training the lead scoring model 300. On the other hand, imputed datasets may not be as impactful for large datasets with small reject/mislabel rates. In one or more implementations, the lead management system 102 determines the size threshold (along with the split threshold and success rate threshold) for an entity or data type. This allows the lead management system 102 to customize the generation of imputed datasets for each use case based on how the imputed datasets affect the lead scoring model 300.

After determining that the original dataset does not meet the thresholds, the lead management system 102 can generate and use the imputed dataset 310 to modify/train the lead scoring model 300. In particular, the lead management system 102 may determine that the original dataset does not meet all of the thresholds prior to generating and using the imputed dataset. If the original dataset meets any one of the thresholds, the lead management system 102 may use the original dataset instead. Alternatively, the lead management system 102 may generate an imputed dataset even if the original dataset meets one or more of the thresholds or combinations of thresholds.

Although FIG. 3 illustrates a flowchart of sequential steps for determining whether to use an original dataset or an imputed dataset for the lead scoring model 300, the lead management system 102 can process the dataset for comparing to thresholds in a single operation or in multiple operations. For example, the lead management system 102 can determine the split effectiveness, success rate, and size simultaneously during a single group of simulations for the original dataset. Alternatively, the lead management system 102 can perform the operations of FIG. 3 in any order and may exclude one or more of the thresholds or include one or more additional thresholds based on the characteristics associated with the original dataset.

The following provides a detailed description of the process for determining whether to use an imputed dataset and for determining which reject inference model to use. For the following description, let N be the sample size of the original dataset from a through-the-door population. For each i=1, . . . , N, let $X_i$ be the p-dimensional feature vector of the ith observation and $y_i \in \{0,1\}$ be the corresponding binary outcome (e.g., success or failure). An acceptance indicator is defined as $a_i$=I (ith observation considered accepted) and the engagement indicator is $e_i$=I (ith observation is engaged), where I(B)=1 if B occurs and 0 otherwise. For example, B can represent a conversion. Furthermore, define [V]={1, 2, 3, . . . , N}, in which the set of accepted indices (or leads) is A={$\in$ [N]|$a_i$=1}, the set of rejected indices is R={i $\in$ [N]|$a_i$=0}, and the set of engaged indices is E={$\in$ [N]|$e_i$=1}. X represents the N×p matrix in which each row represents a feature vector for an observation.

Furthermore, for any S $\subset$ [N], the number of elements in S is represented as $n_S$=|S|, the number of positive instances in S is represented as $n_S^+=\Sigma_{i \in S}I(y_i=1)$, the number of negative instances in S is $n_S^+=\Sigma_{i \in S}I(y_i=1)$, and $$rs = \frac{n_S^+}{n_S}$$

is the success rate of S.

Additionally, the acceptance rate is defined as $$rate_{acc} = \frac{n_A}{N},$$

which is the proportion of accepted leads over all leads in the dataset. In one or more embodiments, the acceptance rate is limited by the available resources for engagement. Furthermore, rA represents marketing qualified leads ("MQL") and rR represents inquiries rate ("INQ").

In at least some embodiments, the set of engaged leads E includes the set of accepted leads A and at least some leads from the set of rejected leads R. The number of rejected leads included in the set of engaged leads can vary depending on the available resources, as well as the risk tolerance for the particular embodiment.

As described previously, conventional systems apply a KGB model that uses only the known labels. If only the accepted leads are engaged and only labels for A are available, the KGB model is developed based on ($X_A$, $y_A$) by dividing A into pseudo-accepted leads and pseudo-rejected leads. Because the KGB model utilizes only known labels, however the resulting performance metric is likely to be biased. Additionally, the KGB model may not split the accepted leads into pseudo-accepted/pseudo-rejected leads in the same way the lead scoring model splits the through-the-door population.

In the context of lead scoring, the lead management system 102 can allow an entity to engage with at least a portion of rejected leads to more fully explore a pool of prospects. Accordingly, the lead management system 102 determines an estimate for the area under the receiver operating characteristic curve (i.e., area under ROC curve or simply "AUC"). In particular, the lead management system 102 first estimates the overall true positive rate ("TPR") and overall false positive rate ("FPR") for the original dataset. The TPR and FPR may be reasonably estimated via reweighting if the lead management system 102 obtains partial rejects via random sampling.

The overall TPR is a weighted average of the TPR for accepted leads and the TPR for rejected leads. Similarly, the overall FPR is a weighted average of the FPR for accepted leads and the FPR for rejected leads. In particular, the overall TPR is represented as:

$$TPR_{overall} = \frac{n_A^+}{n_A^+ + n_R^+} TPR_{acc} + \frac{n_R^+}{n_A^+ n_R^+} TPR_{rej},$$

in which $$\widehat{TPR}_{rej} = \frac{\sum_{i \in R_{sub}} I(y_i = 1, \hat{y}_i = 1)}{\hat{n}_{rej}^+}.$$

Similarly, the overall FPR is represented as:

$$FPR_{overall} = \frac{n_A^-}{n_A^- + n_R^-} FPR_{acc} + \frac{n_R^-}{n_A^- + n_R^-} FPR_{rej},$$

in which $$\widehat{FPR}_{rej} = \frac{\sum_{i \in R_{sub}} I(y_i = 1, \hat{y}_i = 1)}{\hat{n}_{rej}^-}.$$

The lead management system can then estimate AUC using the above TPR and FPR estimates.

Information on whether a lead has been engaged may be missing for certain bases. For instance, failed engaged leads and unengaged rejected leads may be labeled as "0" because of a negative outcome or negative engagement. Accordingly, unengaged rejected leads that are labeled as "1" are mislabeled.

If the split of the original dataset is effective, it is likely that $r_A \geq r_R$. The observed number of "1" labels in the rejected leads, however, is at least the total number of "1" labels in the rejected leads. Because $n_{R_{sub}}^+ \leq n_R^+ = (r_R)(n_R) \leq (r_A)(n_R)$, a conservative estimate of $TPR_{overall}$ is $TPR_{overall} := \min(A, B)$ where $$A = \frac{n_A^-}{n_A^+ + n_{R_{sub}}^+} TPR_{acc} + \frac{n_A^+}{n_A^+ + n_{R_{sub}}^+} \widehat{TPR}_{rej},$$

and $$B = \frac{n_A^+}{n_{acc}^+ + (r_R)(n_{rej})} TPR_{acc} + \frac{(r_R)(n_{rej})}{n_A^+ + (r_R)(n_{rej})} \widehat{TPR}_{rej}.$$

Figure 4:
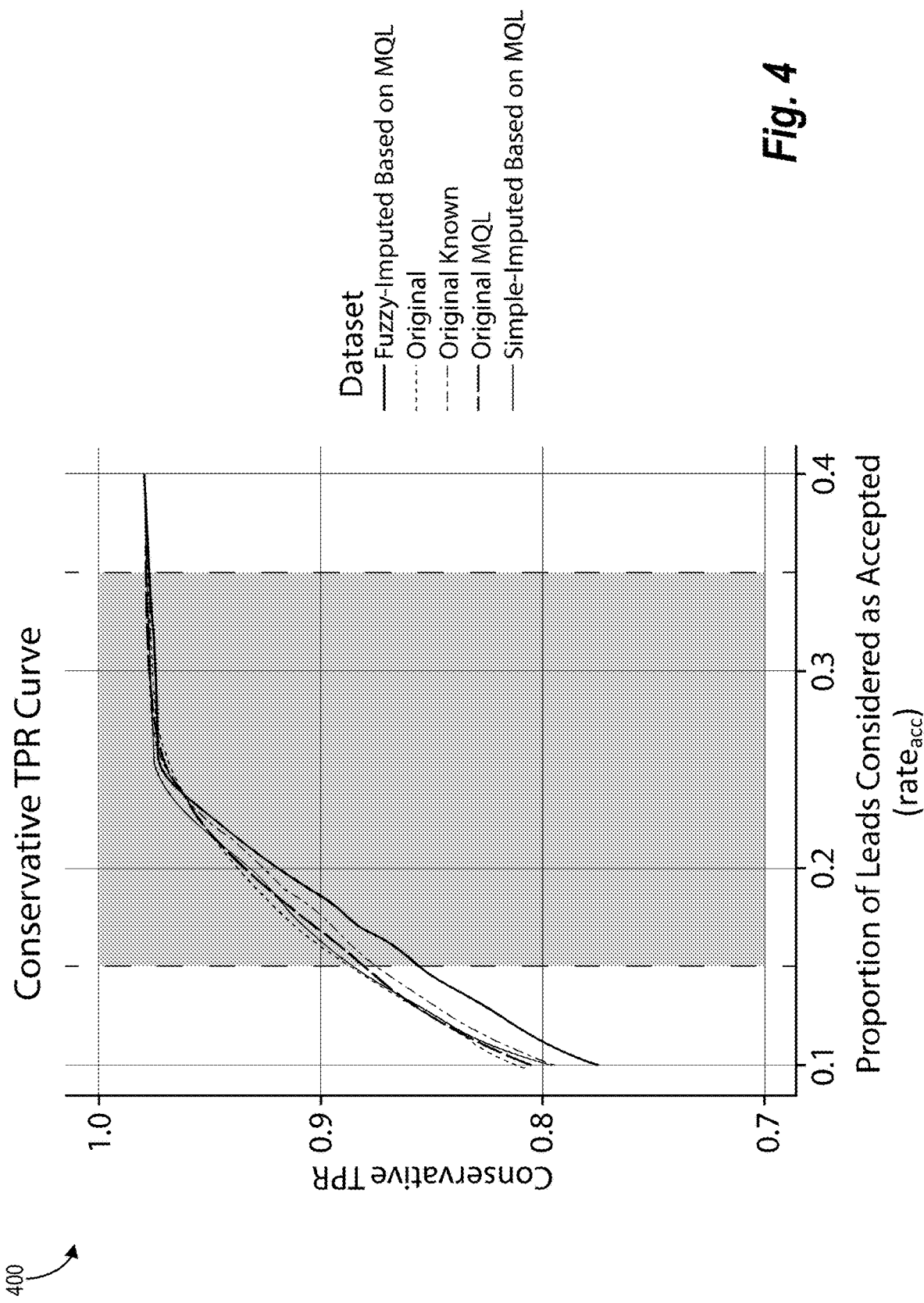
FIG. 4 illustrates a graph diagram of an embodiment of a plurality of true positive rate curves in accordance with one or more implementations.

In one or more embodiments, for a given classifier in a lead scoring case, there is a true positive rate that corresponds to every choice of the accepted rate. This results in a function TPR:[0, 1]→[0, 1] of the classifier. A TPR curve for the TPR function allows for a graphical comparison among classifiers. FIG. 4 illustrates a graph 400 of conservative estimates of TPR curves, as described above, for five different classifiers based on experimental datasets, described in more detail below. Specifically, the classifiers include random forest models trained using different data.

More specifically, the classifiers include a classifier trained on a fuzzy-imputed dataset based on the MQL data of an original dataset, a classifier trained on the original dataset, a classifier trained on the known labels of the original dataset (i.e., MQL data and engaged INQ "1" data), a classifier trained on the MQL data of the original dataset, and a classifier trained on a simple-imputed dataset based on the MQL data of the original dataset. As illustrated, separation between the classifiers increases with lower accepted rates, while the classifiers have similar TPR curves with higher accepted rates. As described previously, certain characteristics of the datasets can affect the effectiveness of the imputed datasets, including dataset size, INQ rate, predictors used, etc.

The lead management system 102 performed experiments using the lead scoring and reject inference techniques described herein. In particular, the experimental data included an original dataset (i.e., dataset with nominal labels) in which each lead has 378 features including behavioral information and prior experience with a product. The lead management system 102 split the dataset into a training set including data from 2014-2016 and a test set including data during the last half of 2016. The lead management system 102 utilized machine-learning models involving case-weighted random forests and used TPRC and pAUTPRC on the test set for model comparison. Furthermore, based on empirical experience, the lead management system 102 determined that a reasonable range for the acceptance rate is [15%, 35%].

In one or more embodiments, the lead management system 102 generate a numerical metric for comparing classifiers. In particular, the lead management system 102 can analyze the area under the TPR curve ("AUTPRC"), which shares similarities to the AUC for the ROC curve (the probability that a randomly chosen positive instance has a higher score than a randomly chosen negative instance). AUTPRC is defined as:

$$AUTPRC = \int_0^1 TPR(rate_{acc}) d(rate_{acc}).$$

Defined as such, AUTPRC is the probability that a randomly chosen positive instance has a higher score than a randomly chosen instance. Furthermore, the relationship between the AUTPRC and the AUC can be expressed as:

$$AUTPRC = \frac{1}{2}\phi + (1-\phi)AUC,$$

in which $\phi$ represents the overall proportion of positive instances. Furthermore, if a good estimate of $\phi$ is available (e.g., by using historical data), AUC can be approximated using estimates of AUTPRC and $\phi$.

Additionally, the AUTPRC satisfies the following properties:

(a) The AUTPRC of a random classifier is 0.5.

(b) For any classifier with AUC AUC≥0.5, 0.5≤AUTPRC≤AUC.

(c) For an ideal classifier, AUTPRC=1−½$\phi$.

Because and entity may have limited resources, an entity may place a limit on the total number of leads that the entity may follow (e.g., engage with a prospect). Accordingly, the lead management system 102 may calculate the AUTPRC on only a pre-specified range of values [a, b] ⊂ [0,1], resulting in partial AUTPRC, which can be represented as:

$$pAUTPRC = \frac{1}{b-a} \int_a^b TPR(rate_{acc}) d(rate_{acc}).$$

Table 1 below illustrates numerical values of pAUTPRC for the various datasets analyzed in the simulations.

| Dataset | pAUTPRC |
|---|---|
| Original | 0.952 |
| Original MQL | 0.951 |
| Original known | 0.948 |
| Simple-imputed based on MQL | 0.952 |
| Fuzzy-imputed based on MQL | 0.943 |

Evaluating the usefulness of reject inference models is complicated due to all true labels not being available. To resolve this issue, the lead management system 102 performed a simulation study in which the data generating process and lead scoring model are based on logistic regression. According to the present embodiment, the lead management system 102 repeated the simulation 500 times and records the mislabel rates of rejected leads labeled "0" in the imputation stage and the AUC on the test set. Due to randomness involved in the simulation, the lead management system 102 averages the recorded calculations over the 500 experiments to provide a stable result. The logit function is defined as:

$$\text{logit}(\pi) := \log\left(\frac{\pi}{1-\pi}\right), \pi \in (0, 1)$$

and the expit function (i.e., inverse logit function) is:

$$expit(x) := \text{logit}^{-1}(x) = \frac{1}{1+e^{-x}}, x \in (-\infty, \infty).$$

For each simulation, the lead management system 102 simulates $X_{ij}$, $\beta_j$, and $\in_{ij}$ independently from a standard normal distribution for $i=1, \ldots, N$ and $j=1, \ldots, p$. For each i compute:

$$s_i := \log(x_i^T \beta + \in_i).$$

Let $q_d$ be the d-percentile of $(s_1, \ldots, s_N)$. Then for each i, define the true label:

$$y_i = \begin{cases} 0 & \text{if } s_i > q_d \\ y_i & \text{otherwise} \end{cases}.$$

For the selection process (i.e., scoring of the reject data), the lead management system 102 chose a set of $p_{sel}$ predictors S and ran a logistic regression based on $X_S$ and true labels to obtain a maximum likelihood estimate of the coefficient vector:

$$\hat{\beta}_S := \arg\max_{\beta} \sum_{i=1}^{N} \left[y_i \log\left(expit(x_{S,i}^T \beta_S)\right) + (1-y_i)\log\left(1 - expit(x_{S,i}^T \beta_S)\right)\right].$$

For each i, the computed lead score is $t_i = [1 + \exp(-x_{S,i}^T \hat{\beta}_S)]^{-1}$. Additionally, $\tilde{q}_d$ is the d-percentile of $(t_i, \ldots, t_N)$. Then for each I, the selection indicator is:

$$I_i = \begin{cases} 1 & \text{if } t_i > \tilde{q}_d \\ 0 & \text{otherwise} \end{cases}.$$

Let $R=\{i:I_i=0\}$ be the set of rejected observations. The lead management system 102 takes a random subset $R_{sub}$ of R with $|R_{sub}|=\lfloor 0.7|R| \rfloor$ and converts the labels of these observations to 0. More specifically, for each i, the nominal label is defined as:

$$\tilde{y}_i = \begin{cases} 0 & \text{if } i \in R_{sub} \\ y_i & \text{otherwise} \end{cases}.$$

Finally, the lead management system 102 chooses a set of $p_{obs}$ predictors T and treats those as observable predictors. The dataset used for calibrating the lead scoring model is therefore $\{X_{i,T}, \tilde{y}_i\}_{i=1}^N$.

To determine the conditions under which the various reject inference models work well, the lead management system 102 can study sets of parameters (e.g., 2 options for sample size, 2 options of overall proportion of "1" labels, and 2 options for the set of observable predictors) for the data generating process. The simulation parameter specification for the simulations on the experimental data include the following:

Number of predictors: p=200

Sample size: N=3000 (small) and N=30000 (large)

Overall proportion of "1" labels: 10% (rare) or 50% (frequent)

Predictors used in the historical selection process: S=1st-4th (weak selection mechanism)

Observable predictors: T=3rd-40th (little information) or 3rd-125th (much information)

For the scenario of small overall success rate, the mislabel rate among $R-R_{sub}$ is small, while the mislabel rate could be higher after generating the imputed dataset. On the other hand, when the overall success rate is high, the mislabel rate among $R-R_{sub}$ is high, and the scoring performance trained based on the nominal dataset is much poorer than those based on the imputed datasets. High mislabel rates are negatively correlated with low AUCs.

Additionally, when the sample size is large, the performance gap between training based on the dataset with true labels and the next best performing dataset is small. When the sample size is small, however, the gap is significantly wider. This suggests that mislabels has a more severe impact on the final scoring performance as the sample size decreases.

Figure 5A:
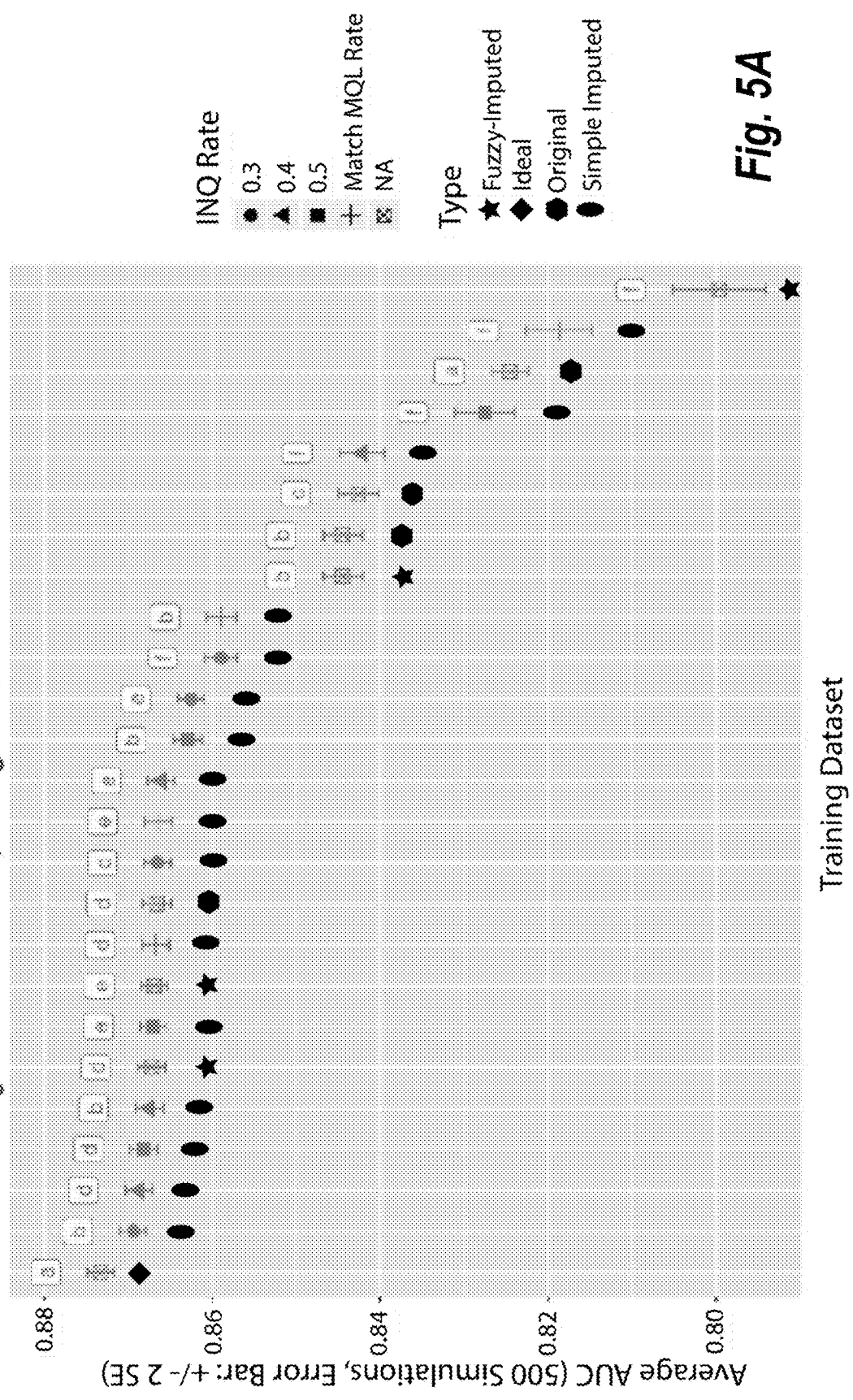
FIGS. 5A-5B illustrate graph diagrams of embodiments of simulation data for selecting a reject inference model in accordance with one or more implementations.
Figure 5B:
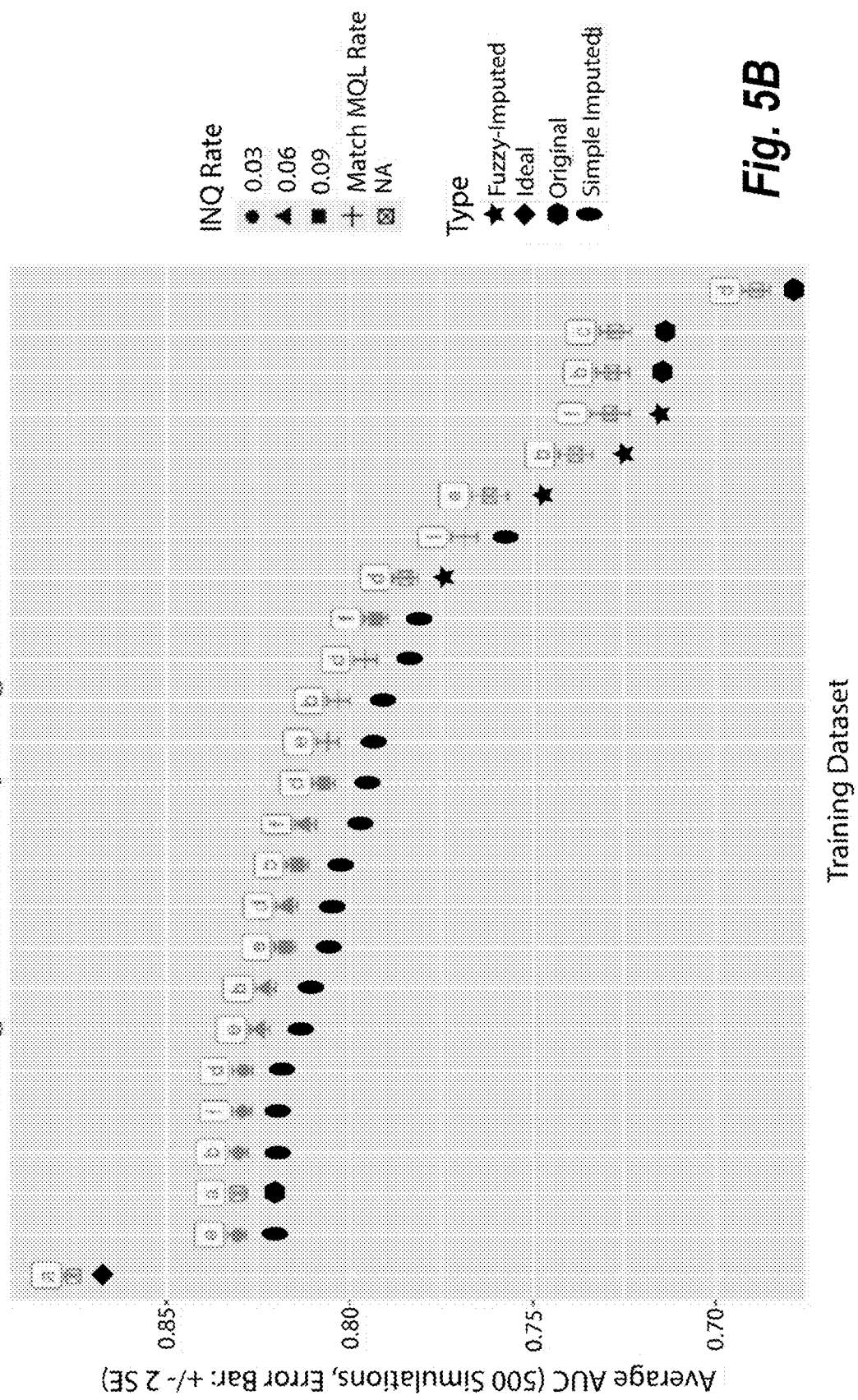

FIGS. 5A-5B illustrate graph diagrams of details of simulations for a plurality of different parameters. In particular, FIG. 5A illustrates a graph diagram of average AUCs for a plurality of classifiers trained on a plurality of training datasets with a first set of simulation parameters. FIG. 5B illustrates a graph diagram of average AUCs for the plurality of classifiers trained on the plurality of training datasets with a second set of simulation parameters. As illustrated, changing simulation parameters changes the resulting AUCs for the classifiers determines which classifier performs better. The lead management system 102 can use the results to select an appropriate dataset/classifier to use for the lead scoring model.

As shown, the simulations of FIG. 5A include a first set of parameters for running the simulations on historical data. For example, the proportion of "1" labels is set at 50% ("prop1=0.5"), the sample size N is 30000, $p_{obs}$=123 (i.e., the number of observable features), average MQL rate=0.568, and average INQ rate=0.477. Furthermore, the lead management system 102 performs the simulations for each classifier based on a specific type of dataset (e.g., all leads, known leads, known (weighted) leads, MQL, MQL+ INQ, or MQL bad+INQ good), INQ rate (e.g., 0.3, 0.4, 0.5, match MQL rate, or not applicable) where applicable, and also whether the classifier type is ideal, original, or imputed (fuzzy or simple).

In the embodiment of FIG. 5A, the ideal classifier has a highest average AUC while a simple-imputed classifier with INQ rate of 0.3 for the known leads dataset has the highest average AUC for a non-ideal classifier, followed by a simple-imputed classifier and INQ rate of 0.4, etc. Finally, the fuzzy-imputed classifier with no INQ rate has the lowest average AUC. As shown, the different types of classifiers perform differently based on the INQ rate and/or dataset. To illustrate, the simple-imputed classifier with an INQ rate of 0.4 has a slightly higher average AUC for the MQL dataset than for the known leads dataset. Similarly, the simple-imputed classifier for the MQL dataset has a higher average AUC for an INQ rate of 0.4 than for an INQ rate of 0.5.

As illustrated in FIG. 5B, the simulations include a second set of parameters for running the simulations on historical data. For example, the proportion of "1" labels is set at 10% ("prop1=0.1"), the sample size N is 3000, $p_{obs}$=123, average MQL rate=0.135, and average INQ rate=0.089. Furthermore, the INQ rates in the simulations of FIG. 5B includes 0.03, 0.06, 0.09, matching MQL rate, and not applicable. In the embodiment of FIG. 5B, the non-ideal classifier with the highest average AUC is the simple-imputed classifier with an INQ rate of 0.03 and for the MQL+INQ dataset. The next highest classifier is the original classifier for all leads, though the separation is minimal. Accordingly, the lead management system 102 may determine not to generate an imputed dataset for an original dataset that matches the parameters of the simulations of FIG. 5B.

Figure 6:
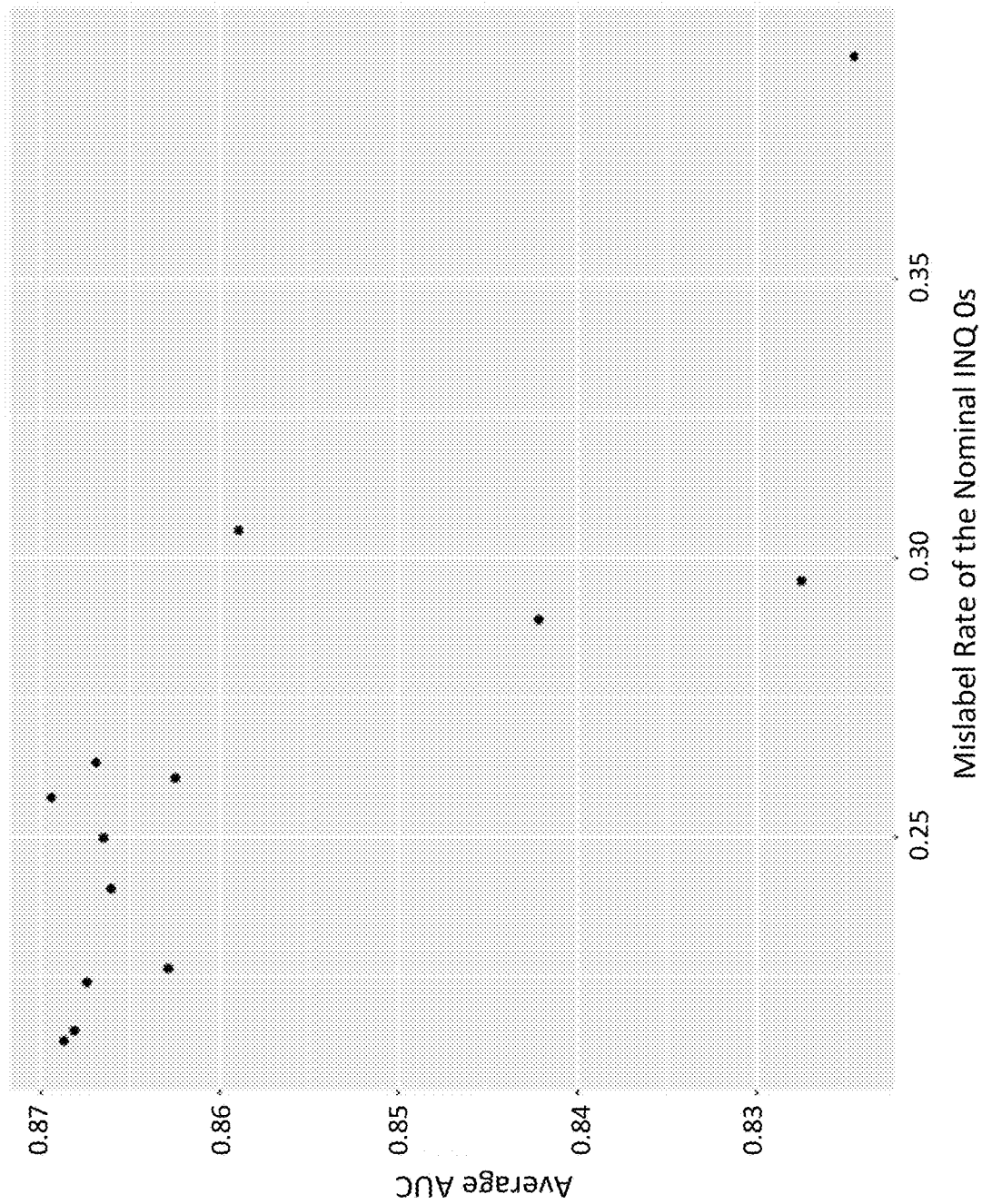
FIG. 6 illustrates a graph diagram of an embodiment indicating correlation between area under receiver operating characteristic curves and mislabel rates for simulation data in accordance with one or more implementations.

FIG. 6 illustrates a scatterplot of the average AUC vs mislabel rates of nominal INQ "0" labels over 500 simulations. The parameter setup for this scatterplot is the same as that of the simulations in FIG. 5A. As shown, the average AUC is negatively correlated with the mislabeled INQs (correlation=−0.8249. This means that a lower mislabel rate of the nominal INQ leads in the original dataset is more likely to result in a higher average AUC. Conversely, a higher mislabel rate of the nominal INQ leads in the original dataset is more likely to result in a lower average AUC.

As described in relation to FIGS. 2-6, the lead management system 102 can thus perform operations for analyzing an original dataset by performing simulations on the original dataset to determine whether to generate an imputed dataset. Performing the simulations also allows the lead management system 102 to determine which reject inference model to use for generating the imputed dataset. Accordingly, the acts and operations illustrated and described above in relation to FIGS. 2-6 provide the corresponding structure for an example step for generating an imputed dataset by selecting a reject inference model from a plurality of reject inference models and generating outcome data by performing a plurality of simulations.

Figure 7:
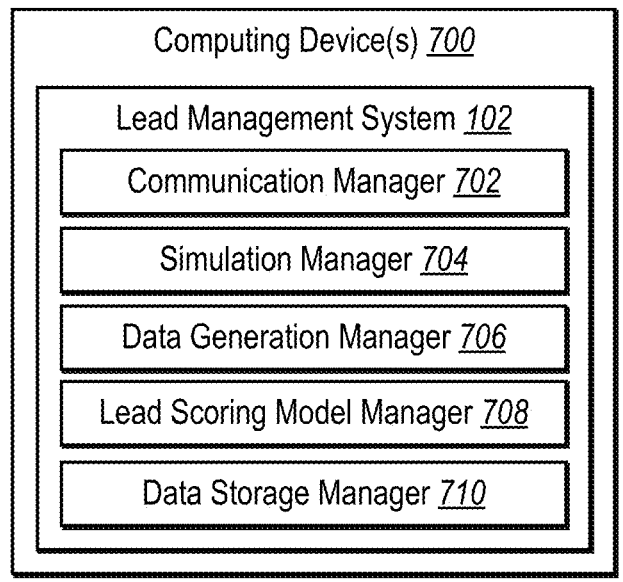
FIG. 7 illustrates a schematic diagram of the lead management system of FIG. 1 in accordance with one or more implementations.

FIG. 7 illustrates a detailed schematic diagram of an embodiment of the lead management system 102 of FIG. 1. As shown, the lead management system 102 can be implemented on computing device(s) 700. Additionally, the lead management system 102 can include, but is not limited to, a communication manager 702, a simulation manager 704, a data generation manager 706, a lead scoring model manager 708, and a data storage manager 710. The lead management system 102 can be implemented on any number of computing devices. For example, the lead management system 102 can be implemented in a distributed system of server devices for managing leads and synthetic data generation for any number of systems or entities. Alternatively, the lead management system 102 can be implemented on a single computing device, such as a single server device in communication with a plurality of different devices.

In one or more embodiments, each of the components of the lead management system 102 are in communication with one another using any suitable communication technologies. Additionally, the components of the lead management system 102 can be in communication with one or more other devices including the administrator device 106, the prospect client devices 108a, 108b, and the content server 110. It will be recognized that although the components of the lead management system 102 are shown to be separate in FIG. 7, any of the subcomponents may be combined into fewer components, such as into a single component, or divided into more components as may serve a particular implementation. Furthermore, although the components of FIG. 7 are described in connection with the lead management system 102, at least some of the components for performing operations in conjunction with the lead management system 102 described herein may be implemented on other devices within the environment.

The components of the lead management system 102 can include software, hardware, or both. For example, the components of the lead management system 102 can include one or more instructions stored on a computer-readable storage medium and executable by processors of one or more computing devices (e.g., the computing device(s) 700). When executed by the one or more processors, the computer-executable instructions of the lead management system 102 can cause the computing device(s) 700 to perform the lead management and synthetic data generation methods described herein. Alternatively, the components of the lead management system 102 can comprise hardware, such as a special purpose processing device to perform a certain function or group of functions. Additionally, or alternatively, the components of the lead management system 102 can include a combination of computer-executable instructions and hardware.

Furthermore, the components of the lead management system 102 performing the functions described herein with respect to the lead management system 102 may, for example, be implemented as part of a stand-alone application, as a module of an application, as a plug-in for applications including marketing applications, as a library function or functions that may be called by other applications, and/or as a cloud-computing model. Thus, the components of the lead management system 102 may be implemented as part of a stand-alone application on a personal computing device or a mobile device. Alternatively, or additionally, the components of the lead management system 102 may be implemented in any application that allows lead management, including, but not limited to, applications in ADOBE® ANALYTICS CLOUD, such as ADOBE® ANALYTICS, ADOBE® AUDIENCE MANAGER, ADOBE® CAMPAIGN, ADOBE® EXPERIENCE MANAGER, and ADOBE® TARGET. "ADOBE", "ADOBE ANALYTICS CLOUD", "ADOBE ANALYTICS", "ADOBE AUDIENCE MANAGER", "ADOBE CAMPAIGN", "ADOBE EXPERIENCE MANAGER", and "ADOBE TARGET" are registered trademarks of Adobe Systems Incorporated in the United States and/or other countries.

As mentioned, the lead management system 102 includes a communication manager 702 to facilitate the management of communications with one or more external devices. For example, the communication manager 702 can allow the lead management system 102 to communicate with other devices associated with an entity (e.g., administrator device 106 or content server 110 of FIG. 1), devices attempting to access content servers (e.g., prospect client devices 108a, 108b), content databases, or other devices or systems. The communication manager 502 can thus allow the lead management system 102 to receive and provide data in connection with managing and scoring leads, generating synthetic data for leads, or updating lead scoring models for one or more entities.

The lead management system 102 also includes a simulation manager 704 to facilitate the performance of simulations on data corresponding to leads. For example, the simulation manager 704 can access one or more datasets (e.g., historical data) including information about leads and then perform simulations on the datasets using a plurality of parameters. The simulation manager 704 can analyze the results of the simulations to determine whether and how the lead management system 102 generates synthetic data for a dataset. The simulation manager 704 can also provide simulation data or analysis to one or more other components of the lead management system 102.

Additionally, the lead management system 102 includes a data generation manager 706 to facilitate the generation of synthetic data for datasets. Specifically, the data generation manager 706 can generate synthetic outcome data for rejected leads of a dataset to augment the dataset for use in updating/modifying a lead scoring model. The data generation manager 706 can utilize one or more reject inference models to generate the synthetic outcomes for rejected leads of an original dataset. Additionally, the data generation manager 706 can communicate with the simulation manager 704 to determine which reject inference model to use when generating an imputed dataset.

The lead management system 102 includes a lead scoring model manager 708 to facilitate the generation of scores for leads associated with an entity. For example, the lead scoring model manager 708 can utilize a lead scoring model to generate scores for leads by analyzing features of the leads and then ranking the leads on a scale. The lead scoring model manager 708 can also assign the leads labels indicating an accepted or rejected lead based on a predetermined threshold.

The lead scoring model manager 708 can also facilitate the management and training of one or more lead scoring models. In particular, the lead scoring model manager 708 can communicate with the data generation manager 706 to obtain an imputed dataset for a particular dataset. The lead scoring model manager 708 can then modify the lead scoring model based on the real outcome data from the original dataset and also the synthetic outcome data from the lead scoring model. The lead scoring model manager 708 can similarly mange a plurality of lead scoring models as may serve a particular embodiment (e.g., for a plurality of different entities or data types).

The lead management system 102 also includes a data storage manager 710 (that comprises a non-transitory computer memory) that stores and maintains data associated with managing leads for one or more entities. For example, the data storage manager 710 can include a database that stores datasets for leads of an entity by storing information about the leads (e.g., features), scores of the leads, engagement information, and outcome information. Additionally, the data storage manager 710 can store information associated with simulations on historical data, including threshold information for determining when to generate an imputed dataset and which reject inference model to use when generating the imputed dataset.

Figure 8:
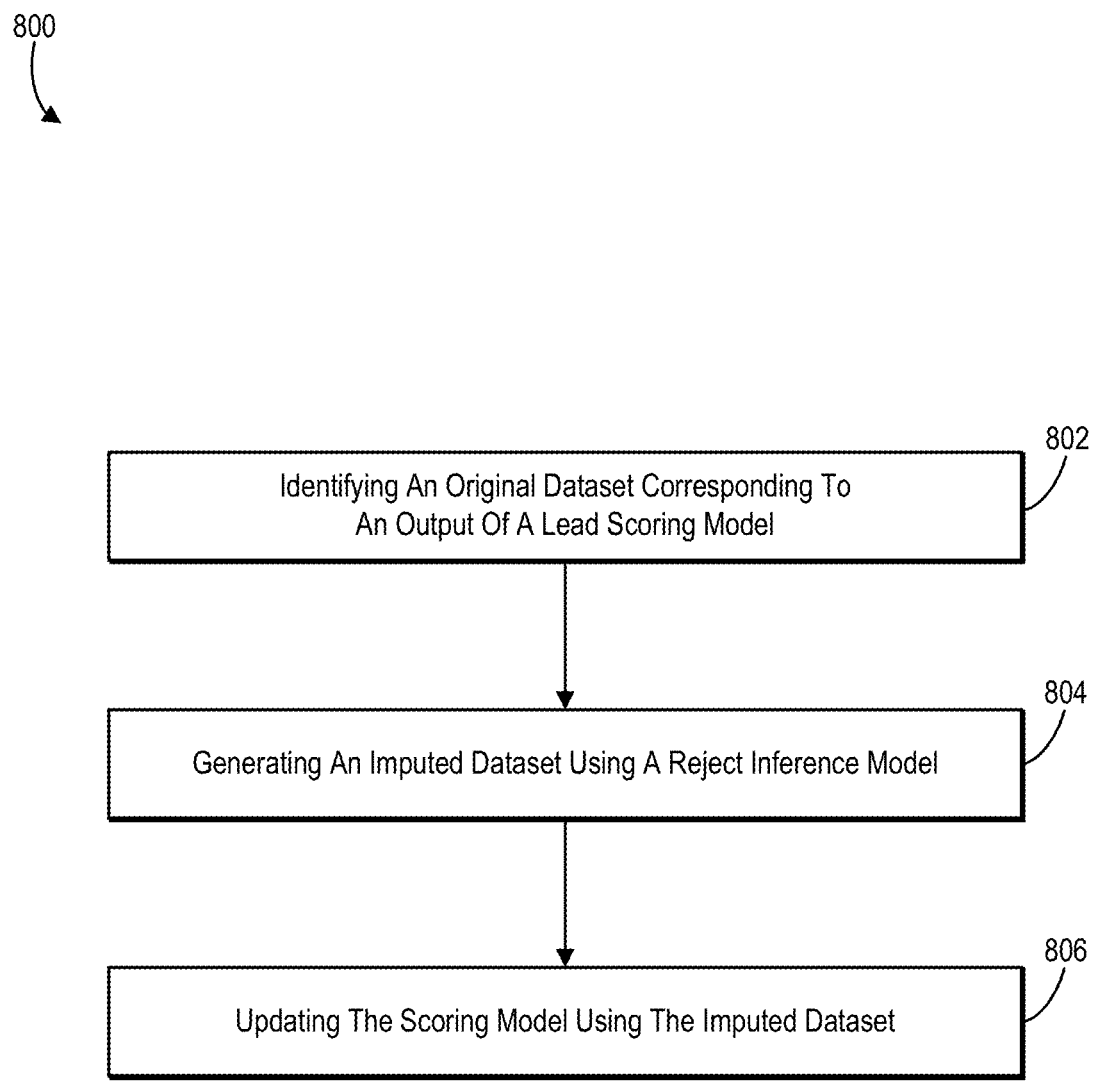
FIG. 8 illustrates a flowchart of a series of acts for using reject inference to generate synthetic data for modify scoring models in accordance with one or more implementations.

Turning now to FIG. 8, this figure illustrates a flowchart of a series of acts 800 of using reject inference to generate synthetic data for modify lead scoring models. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8.

The series of acts 800 includes an act 802 of identifying an original dataset corresponding to an output of a lead scoring model. For example, act 802 involves identifying an original dataset corresponding to an output of a lead scoring model that generates scores for a plurality of prospects, the scores indicating a likelihood of success of prospects of the plurality of prospects. The original dataset can include identifying information for the plurality of prospects including a plurality of features of the plurality of prospects. Additionally, the original dataset can include engagement data associated with the plurality of prospects. The original dataset can also include outcome data associated with the plurality of prospects indicating whether engagement with each prospect resulted in a successful outcome or a failed outcome.

The series of acts 800 also includes an act 804 of generating an imputed dataset using a reject inference model. For example, act 804 involves generating, based on the original dataset, an imputed dataset using a reject inference model on a subset of the plurality of prospects to generate synthetic outcome data for the subset. For example, the plurality of reject inference models can include a simple augmentation model and a fuzzy augmentation model.

As part of act 804, or as an additional act, the series of acts 800 can include selecting the reject inference model from a plurality of reject inference models by performing a plurality of simulations using the plurality of reject inference models on historical data associated with the original dataset. For example, the series of acts 800 can include performing the plurality of simulations using classifiers for the plurality of reject inference models under varying combinations of parameters.

The series of acts 800 can then include determining an area under a true positive rate curve for each classifier and selecting the reject inference model from the plurality of reject inference models based on the determined area under the true positive rate curve of the selected reject inference model. Furthermore, the series of acts 800 can include determining a conservative area under the true positive rate curve based on an assumption that a number of observed mislabeled rejected prospects in the original dataset is at least equal to a total number of mislabeled rejected prospects in the original dataset.

Act 804 can also involve identifying a characteristic of the original dataset based on the plurality of prospects in the original dataset. For example, the characteristic comprises a split effectiveness of the lead scoring model for the original dataset, a success rate of the original dataset, or a size of a set of known labels in the original dataset. Act 804 can further involve determining that the characteristic of the original dataset does not meet a characteristic threshold indicating whether to use the original dataset or to generate the synthetic outcome data. Act 804 can then involve generating the synthetic outcome data in response to determining that the characteristic of the original dataset does not meet the characteristic threshold. Additionally, act 804 can involve comparing a plurality of characteristics of the original dataset to a plurality of characteristic thresholds, and then generating the synthetic outcome data in response to determining that the plurality of characteristics of the original dataset do not meet the plurality of characteristic thresholds.

The series of acts 800 can also include determining the plurality of characteristic thresholds based on historical data associated with the original dataset. For example, the series of acts 800 can include performing a plurality of simulations on the historical data associated with the original dataset using one or more reject inference models. The series of acts 800 can then include selecting the plurality of characteristic thresholds based on results of the plurality of simulations.

Additionally, the series of acts 800 can include determining a plurality of features of the plurality of prospects for generating the synthetic outcome data. Determining the plurality of features of the plurality of prospects can involve performing a plurality of simulations on historical data associated with the original dataset using variable combinations of the plurality of features. Determining the plurality of features of the plurality of prospects can then involve selecting a set of features based on a performance of the variable combinations of the plurality of features in the plurality of simulations.

Additionally, the series of acts 800 includes an act 806 of updating the scoring model using the imputed dataset. For example, act 806 involves updating the lead scoring model using the imputed dataset by modifying at least one parameter of the lead scoring model based on the synthetic outcome data.

Act 806 can involve using synthetic outcome data from a fuzzy augmentation model to update the lead scoring model, the synthetic outcome data from the fuzzy augmentation model including scores for rejected prospects of the plurality of prospects and weights associated with the scores for the rejected prospects. Updating the lead scoring model using the synthetic outcome data from the fuzzy augmentation model can involve using the weights associated with the scores for the rejected prospects to adjust a loss function associated with the lead scoring model. Alternatively, updating the lead scoring model using the synthetic outcome data from the fuzzy augmentation model can involve using the weights associated with the scores for the rejected prospects to adjust bootstrap probabilities of observations associated with the lead scoring model.

The series of acts 800 can also include scoring a plurality of new prospects using the updated lead scoring model based on the synthetic outcome data. Alternatively, the series of acts 800 can include re-scoring the plurality of prospects of the original dataset.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
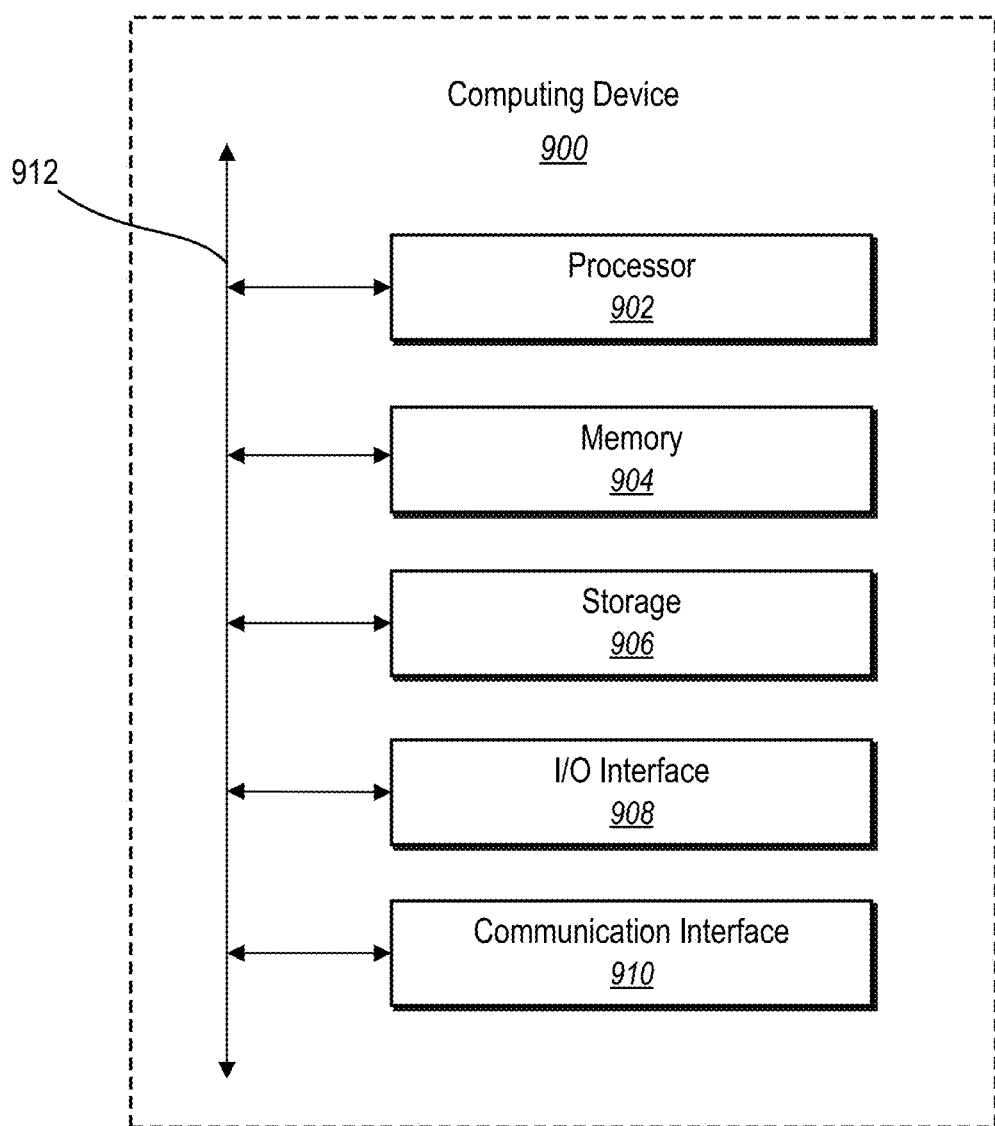
FIG. 9 illustrates a block diagram of an exemplary computing device in accordance with one or more embodiments.

FIG. 9 illustrates a block diagram of exemplary computing device 900 that may be configured to perform one or more of the processes described above. One will appreciate that one or more computing devices such as the computing device 900 may implement the lead management system 102. As shown by FIG. 9, the computing device 900 can comprise a processor 902, a memory 904, a storage device 906, an I/O interface 908, and a communication interface 910, which may be communicatively coupled by way of a communication infrastructure 912. In certain embodiments, the computing device 900 can include fewer or more components than those shown in FIG. 9. Components of the computing device 900 shown in FIG. 9 will now be described in additional detail.

In one or more embodiments, the processor 902 includes hardware for executing instructions, such as those making up a computer program. As an example, and not by way of limitation, to execute instructions for dynamically modifying workflows, the processor 902 may retrieve (or fetch) the instructions from an internal register, an internal cache, the memory 904, or the storage device 906 and decode and execute them. The memory 904 may be a volatile or non-volatile memory used for storing data, metadata, and programs for execution by the processor(s). The storage device 906 includes storage, such as a hard disk, flash disk drive, or other digital storage device, for storing data or instructions for performing the methods described herein.

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example, and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 910 may facilitate communications with various types of wired or wireless networks. The communication interface 910 may also facilitate communications using various communication protocols. The communication infrastructure 912 may also include hardware, software, or both that couples components of the computing device 900 to each other. For example, the communication interface 910 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for classifying lead prospects, a computer-implemented method for using reject inference to generate synthetic data for modify machine-learning lead scoring models comprising:
   identifying, by at least one processor, an original dataset corresponding to an output of a machine-learning lead scoring model that generates scores for a plurality of prospects from the original dataset, the scores indicating a likelihood of success of prospects of the plurality of prospects;
   determining, by the at least one processor, a success rate threshold by performing a plurality of simulations that utilize the machine-learning lead scoring model with different parameters to determine success rates of historical data associated with the original dataset;
   determining, by the at least one processor, that a success rate based on a reject rate and a mislabel rate of the original dataset does not meet the success rate threshold;
   selecting, by the at least one processor, a reject inference model from a plurality of reject inference models in response to the success rate not meeting the success rate threshold, each reject inference model of the plurality of reject inference models comprising a model for generating synthetic outcomes for reject data in the original dataset having no outcome data;
   generating, by the at least one processor and based on the original dataset, an imputed dataset comprising synthetic outcome data for reject data in a subset of the plurality of prospects to augment the original dataset by using the reject inference model to generate synthetic outcome labels for the reject data in the subset of the plurality of prospects; and
   updating, by the at least one processor, the machine-learning lead scoring model using the imputed dataset by modifying at least one parameter of the machine-learning lead scoring model based on synthetic outcome data of the imputed dataset.

2. The computer-implemented method as recited in claim 1, wherein selecting the reject inference model from the plurality of reject inference models comprises selecting a simple augmentation model for augmenting the original dataset.

3. The computer-implemented method as recited in claim 1, wherein selecting the reject inference model from the plurality of reject inference models comprises selecting a fuzzy augmentation model for augmenting the original dataset.

4. The computer-implemented method as recited in claim 1, further comprising:
   determining a plurality of characteristics of the original dataset, the plurality of characteristics comprising a split effectiveness of the machine-learning lead scoring model for the original dataset, the success rate of the original dataset, and a size of a set of known labels in the original dataset; and
   generating the imputed dataset comprising the synthetic outcome data in response to determining that one or more of the plurality of characteristics do not meet one or more characteristic thresholds.

5. A non-transitory computer readable storage medium comprising instructions that, when executed by at least one processor, cause a computer system to:
   identify an original dataset corresponding to an output of a machine-learning lead scoring model that generates scores for a plurality of prospects from the original dataset, the scores indicating a likelihood of success of prospects of the plurality of prospects;
   determine a success rate threshold by performing a plurality of simulations that utilize the machine-learning lead scoring model with different parameters to determine success rates of historical data associated with the original dataset;
   determine that a success rate based on a reject rate and a mislabel rate of the original dataset does not meet the success rate threshold;
   select a reject inference model from a plurality of reject inference models in response to the success rate not meeting the success rate threshold, each reject inference model of the plurality of reject inference models comprising a model for generating synthetic outcomes for reject data in the original dataset having no outcome data;
   generate, based on the original dataset, an imputed dataset comprising synthetic outcome data for reject data in a subset of the plurality of prospects to augment the original dataset by using the reject inference model to generate synthetic outcome labels for the reject data in the subset of the plurality of prospects; and
   update the machine-learning lead scoring model using the imputed dataset by modifying at least one parameter of the machine-learning lead scoring model based on the synthetic outcome data of the imputed dataset.

6. The non-transitory computer readable storage medium as recited in claim 5, further comprising instructions that, when executed by the at least one processor, cause the computer system to determine the success rate threshold by performing the plurality of simulations to determine a threshold that meets a specified accuracy with a specified confidence level based on scoring splits for the original dataset.

7. The non-transitory computer readable storage medium as recited in claim 6, wherein the plurality of reject inference models comprises a simple augmentation model and a fuzzy augmentation model.

8. The non-transitory computer readable storage medium as recited in claim 5, further comprising instructions that, when executed by the at least one processor, cause the computer system to:
   identify a characteristic of the original dataset based on the plurality of prospects in the original dataset;
   determine that the characteristic of the original dataset does not meet a characteristic threshold indicating whether to use the original dataset or to generate the synthetic outcome data; and
   generate the synthetic outcome data in response to determining that the characteristic of the original dataset does not meet the characteristic threshold.

9. The non-transitory computer readable storage medium as recited in claim 8, wherein the characteristic comprises a split effectiveness of the machine-learning lead scoring model for the original dataset, the success rate of the original dataset, or a size of a set of known labels in the original dataset.

10. The non-transitory computer readable storage medium as recited in claim 8, further comprising instructions that, when executed by the at least one processor, cause the computer system to:
compare a plurality of characteristics of the original dataset to a plurality of characteristic thresholds; and
generate the synthetic outcome data in response to determining that the plurality of characteristics of the original dataset do not meet the plurality of characteristic thresholds.

11. The non-transitory computer readable storage medium as recited in claim 10, further comprising instructions that, when executed by the at least one processor, cause the computer system to determine the plurality of characteristic thresholds based on the plurality of simulations on the historical data associated with the original dataset.

12. The non-transitory computer readable storage medium as recited in claim 5, further comprising instructions that, when executed by the at least one processor, cause the computer system to determine a plurality of features of the plurality of prospects for generating the synthetic outcome data, wherein determining the plurality of features comprises:
performing a plurality of additional simulations on the historical data associated with the original dataset using variable combinations of the plurality of features; and
selecting a set of features based on a performance of the variable combinations of the plurality of features in the plurality of simulations.

13. The non-transitory computer readable storage medium as recited in claim 5, further comprising instructions that, when executed by the at least one processor, cause the computer system to score a plurality of new prospects using the updated machine-learning lead scoring model based on the synthetic outcome data.

14. In a digital medium environment for classifying lead prospects, a system for using reject inference to generate synthetic data for modify lead scoring models comprising:
at least one processor; and
a non-transitory computer memory comprising:
an original dataset comprising data for a plurality of prospects; and
instructions that, when executed by the at least one processor, cause the system to:
identify an output of a machine-learning lead scoring model that generates scores for the plurality of prospects from the original dataset, the scores indicating a likelihood of success of each prospect of the plurality of prospects;
determine a success rate threshold by performing a plurality of simulations that utilize the machine-learning lead scoring model with different parameters to determine success rates of historical data associated with the original dataset;
determine that a success rate based on a reject rate and a mislabel rate of the original dataset meets a success rate threshold;
select a reject inference model from a plurality of reject inference models in response to the success rate not meeting the success rate threshold, each reject inference model of the plurality of reject inference models comprising a model for generating synthetic outcomes for reject data in the original dataset having no outcome data;
generate an imputed dataset comprising synthetic outcome data representing simulated outcomes of reject data in a subset of the plurality of prospects to augment the original dataset by using the selected reject inference model on the reject data in the subset of the plurality of prospects; and
modify the machine-learning lead scoring model based on the synthetic outcome data of the imputed dataset by modifying at least one parameter of the machine-learning lead scoring model.

15. The system as recited in claim 14, further comprising instructions that, when executed by the at least one processor, cause the system to:
identify a plurality of characteristics of the original dataset based on the plurality of prospects in the original dataset;
determine that the plurality of characteristics of the original dataset does not meet a plurality of characteristic thresholds indicating whether to use the original dataset or to generate the synthetic outcome data; and
generate the synthetic outcome data in response to determining that the plurality of characteristics of the original dataset does not meet the plurality of characteristic thresholds.

16. The system as recited in claim 15, wherein a characteristic of the plurality of characteristics comprises a split effectiveness of the machine-learning lead scoring model for the original dataset, the success rate of the original dataset, or a size of a set of known labels in the original dataset.

17. The system as recited in claim 15, further comprising instructions that, when executed by the at least one processor, cause the system to determine the plurality of characteristic thresholds based on the plurality of simulations on the historical data associated with the original dataset.

18. The system as recited in claim 14, wherein the instructions that cause the system to generate the imputed dataset using the selected reject inference model further cause the system to:
identify a plurality of rejected prospects of the plurality of prospects lacking outcome data;
generate, using the selected reject inference model, synthetic outcome data for the plurality of rejected prospects, synthetic outcome data for a rejected prospect comprising a label indicating a predicted successful outcome or a predicted negative outcome; and
generate the imputed dataset by augmenting the original dataset with the synthetic outcome data.

19. The system as recited in claim 14, further comprising instructions that, when executed by the at least one processor, cause the system to score a plurality of new prospects using the modified machine-learning lead scoring model based on the synthetic outcome data.

20. The system as recited in claim 14, wherein the plurality of reject inference models comprises a simple augmentation model and a fuzzy augmentation model.

* * * * *